United States Patent
Kitsunai et al.

(10) Patent No.: US 10,372,543 B2
(45) Date of Patent: Aug. 6, 2019

(54) MEMORY SYSTEM

(71) Applicant: TOSHIBA MEMORY CORPORATION, Minato-ku (JP)

(72) Inventors: Kazuya Kitsunai, Fujisawa (JP); Shunitsu Kohara, Yokohama (JP); Satoshi Arai, Yokohama (JP); Yoshihisa Kojima, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/262,232

(22) Filed: Sep. 12, 2016

(65) Prior Publication Data

US 2017/0255564 A1 Sep. 7, 2017

Related U.S. Application Data

(60) Provisional application No. 62/303,952, filed on Mar. 4, 2016.

(51) Int. Cl.
*G06F 11/14* (2006.01)
*G06F 12/02* (2006.01)

(52) U.S. Cl.
CPC .......... *G06F 11/1435* (2013.01); *G06F 11/14* (2013.01); *G06F 11/1402* (2013.01); *G06F 11/1446* (2013.01); *G06F 11/1458* (2013.01); *G06F 12/0246* (2013.01); *Y02D 10/13* (2018.01)

(58) Field of Classification Search
None
See application file for complete search history.

(56) References Cited

U.S. PATENT DOCUMENTS

| 8,200,922 | B2 | 6/2012 | McKean et al. |
| 9,141,293 | B2 | 9/2015 | Nakata |
| 9,342,243 | B2* | 5/2016 | Guo .......................... G06F 3/06 |
| 2009/0327589 | A1* | 12/2009 | Moshayedi ......... G06F 11/1441 |
| | | | 711/103 |

(Continued)

FOREIGN PATENT DOCUMENTS

JP 2013-77074 4/2013

OTHER PUBLICATIONS

U.S. Appl. No. 15/068,893, filed Mar. 14, 2016, Unknown.

Primary Examiner — Sean D Rossiter
Assistant Examiner — Charles J Choi
(74) *Attorney, Agent, or Firm* — Oblon, McClelland, Maier & Neustadt, L.L.P.

(57) ABSTRACT

According to one embodiment, a memory system is connectable to a host. The memory system includes a nonvolatile first memory, a volatile second memory and a controller. The nonvolatile first memory stores translation information. The translation information associates a logical address and a physical address. The volatile second memory stores location information. The location information associates a logical address and a location where the translation information is stored in the first memory. The controller saves a first memory image in the first memory at a first timing, and saves a second memory image in the first memory at a second timing different from the first timing. The first memory image is a part of a memory image of the location information. The second memory image is another part, different form the first memory image, of the memory image of the location information.

18 Claims, 26 Drawing Sheets

(56) References Cited

U.S. PATENT DOCUMENTS

2014/0195754 A1 7/2014 Colgrove et al.
2016/0048328 A1 2/2016 Kitsunai
2016/0342509 A1* 11/2016 Kotte ................. G06F 12/0246
2017/0123933 A1* 5/2017 Gallagher ........... G06F 11/1451

* cited by examiner

MEMORY SYSTEM

CROSS-REFERENCE TO RELATED APPLICATIONS

This application is based upon and claims the benefit of priority from U.S. Provisional Application No. 62/303,952, filed on Mar. 4, 2016; the entire contents of which are incorporated herein by reference.

FIELD

Embodiments described herein relate generally to a memory system.

BACKGROUND

In the past, a memory system having a nonvolatile memory such as a flash memory as a storage memory is known. The memory system stores one or more pieces of translation information therein. Each piece of translation information indicates a relation between a logical address and a physical address. The logical address is address information indicating a logical location in a logical address space provided by the memory system to a host. The physical address is address information indicating physical location in the nonvolatile memory. More specifically, each piece of translation information maps a logical address to a physical location in the nonvolatile memory. The memory system updates corresponding translation information in response to writing of data for which a location is designated by a logical address into the nonvolatile memory.

The memory system includes not only the storage memory hut also a volatile memory. The memory system stores, upon its operation, the all pieces or at least some pieces of translation information into the volatile memory, and uses each piece of the translation information stored in the volatile memory. The memory system writes each piece of the translation information updated on the volatile memory into the nonvolatile memory. The volatile memory stores multiple pieces of location information each indicating a location in which a piece of translation information is stored. The memory system writes each piece of the location information stored in the volatile memory to the nonvolatile memory in accordance with a particular scheme. After recovery from interruption of power supply provided from the outside, the memory system recovers each piece of the location information on the volatile memory on the basis of information written in the nonvolatile memory.

DETAILED DESCRIPTION

In general, according to one embodiment, a memory system is connectable to a host. The memory system includes a nonvolatile first memory, a volatile second memory and a controller. The nonvolatile first memory stores translation information. The translation information associates a logical address and a physical address. The logical address indicates a location in an address space provided to the host. The physical address indicates a physical location in the first memory. The volatile second memory stores location information. The location information associates a logical address and a location where the translation information is stored in the first memory. The controller saves a first memory image in the first memory at a first timing, and saves a second memory image in the first memory at a second timing different from the first timing. The first memory image is a part of a memory image of the location information. The second memory image is another part, different form the first memory image, of the memory image of the location information.

Exemplary embodiments of memory systems will be explained below in detail with reference to the accompanying drawings. The present invention is not limited to the following embodiments.

(First Embodiment)

Figure 1:
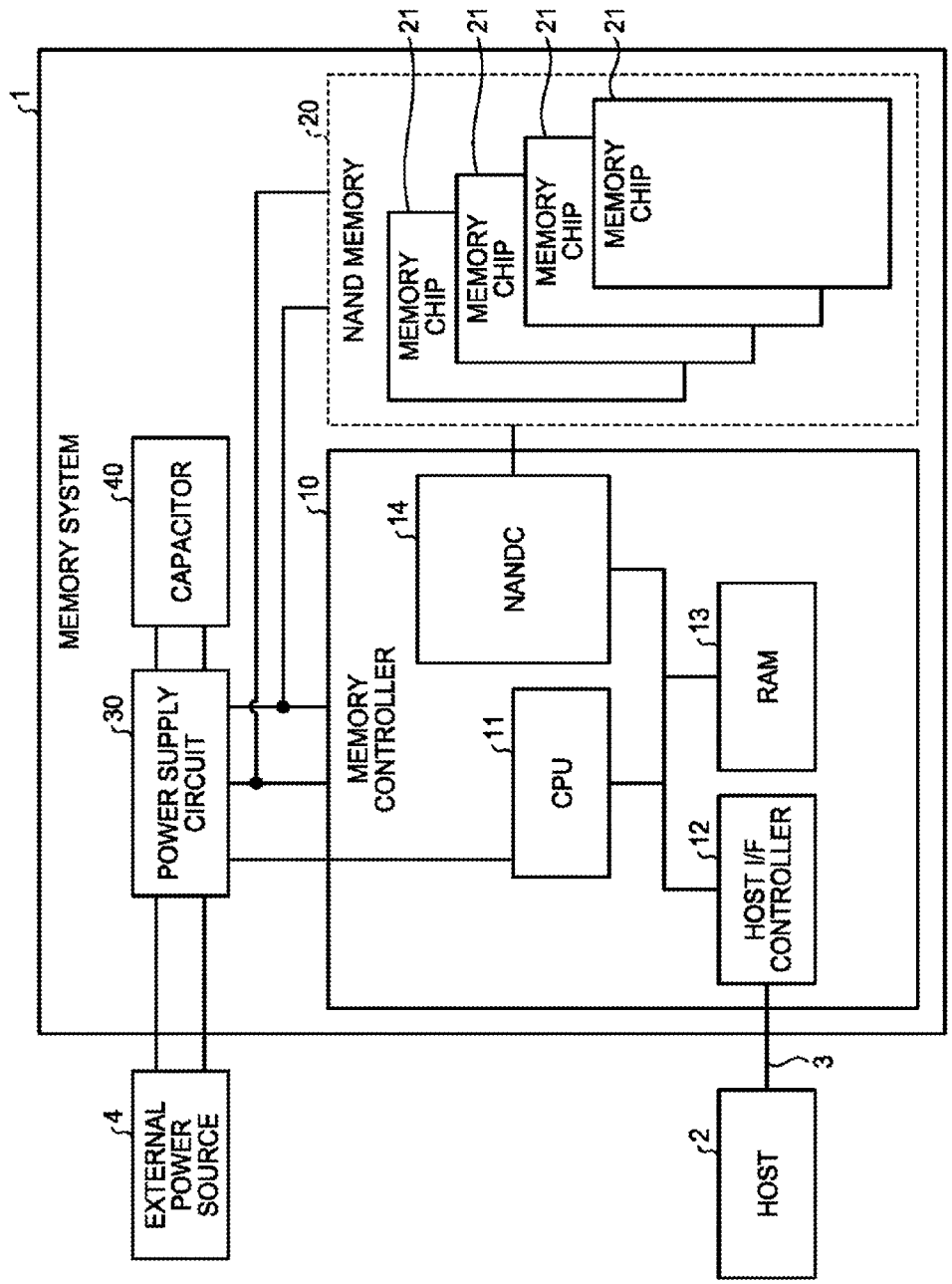
FIG. 1 is a figure illustrating an example of a configuration of a memory system according to a first embodiment.

FIG. 1 is a figure illustrating an example of a configuration of a memory system according to a first embodiment. A memory system 1 is connected to a host 2 via a communication path 3. The host 2 is a processor or a peripheral device of a computer. The computer include for example, a personal computer, a portable computer, a server apparatus (a server system), or a portable communication device. The memory system 1 functions as an external storage apparatus of the host 2. Any given standard may be employed as an interface standard of the communication path 3. The host 2 can issue an access request (a write request, a read request) to the memory system 1. The access request includes logical address information logical address). The logical address indicates a location (address) in a logical address space provided by the memory system 1 to the host 2.

The memory system 1 includes a memory controller 10, a NAND-type flash memory (NAND memory) 20, a power supply circuit 30, and a capacitor 40. The NAND memory 20 is used as a storage memory. The type of a memory used as the storage memory is not limited to only the NAND-type flash memory. For example, a NOR-type flash memory, a resistive random access memory (ReRAM), a magnetoresistive random access memory (MRAM), or the like can be employed as the storage memory. The storage memory may be a nonvolatile memory.

The power supply circuit 30 provides electric power provided from the external power source 4 to the memory controller 10 and the NAND memory 20 with converting or without converting the electric power. The external power source 4 may be incorporated in the host 2, or may be installed outside of the host 2. The memory controller 10 and the NAND memory 20 operate by using the electric power provided from the power supply circuit 30. The power supply circuit 30 charges the capacitor 40 by using the electric power provided from the external power source 4. Any kind of battery may be employed as the capacitor 40 so as to be capable of storing electrical charge (electrons or holes). The capacitors 40 include an electrolytic capacitor or an electrical double layer capacitor.

The memory system 1 receives a previous notice of power off from the host 2 before the power off. When the memory controller 10 (more specifically, a CPU 11 explained later) receives the previous notice, the memory controller 10 activates a power off sequence (a normal power off sequence). In a case where the external power supply is interrupted without any previous notice of the power off, the power supply circuit 30 detects a stop of the external power supply. For example, the power supply circuit 30 monitors voltage of the electric power provided from the external power source 4, and when monitored value of the voltage becomes less than a threshold value, detects stop of the external power supply. The power supply circuit 30 notifies the CPU 11 that the external power supply has stopped. The CPU 11 activates an emergency power off sequence in response to reception of a notification of stop of the external power supply. The capacitor 40 provides an electric power for achieving the emergency power off sequence. The power supply circuit 30 switches supply source of the electric power from the external power source 4 to the capacitor 40 in response to the stop of the external power supply. The normal power off sequence and the emergency power off sequence include processing of non-volatilization. The non-volatilization includes processing for saving predetermined kind of information in the volatile memory (the random access memory (RAM) 13 in this case) into the nonvolatile memory (the NAND memory 20 in this case). Any method may be employed as the method of saving. In the non-volatilization, the predetermined kind of information in the volatile memory may be copied to the nonvolatile memory as it is, or the predetermined kind of information in the volatile memory may be converted and the converted predetermined kind of information may be stored into the nonvolatile memory. The normal power off sequence and the emergency power off sequence may be different from each other or may be the same. Hereinafter, regardless of presence/absence of a previous notice of power off, stop of the power supply from the external power source 4 will be referred to as "power supply interruption".

When the power supply from the external power source 4 is started (in other words, when the memory system 1 returns from the power supply interruption), the power supply circuit 30 detects the start of the external power supply. The power supply circuit 30 notifies the CPU 11 that the external power supply has started. The CPU 11 activates the power on sequence in response to the reception of the notification of the start of the external power supply. The power on sequence indicates processing for causing the state of the memory system 1 to transit to a state in which an access request from the host 2 can be processed. The power on sequence includes a reset and the like of each element in the memory controller 10 (a host I/F controller 12, a RAM 13, or a NANDC 14 explained later).

The NAND memory 20 includes one or more memory chips 21. In this case, the NAND memory 20 includes four memory chips 21. Each memory chip 21 includes a plurality of blocks. A block is a minimum unit on which erase processing is performed. Each block includes multiple pages. A page is a minimum unit on which read processing and program processing are performed.

The memory controller 10 includes the CPU (Central Processing Unit) 11, the host interface (Host I/F) controller 12, the RAM 13, and the NAND controller (NANDC) 14. The CPU 11, the Host I/F controller 12, the RAM 13, and the NANDC 14 are connected with each other via a bus. The RAM 13 may be provided outside of the memory controller 10.

The Host I/F controller 12 executes control of the communication path 3. The Host I/F controller 12 receives various kinds of requests from the host 2. The Host I/F controller 12 executes data transfer between the host 2 and the RAM 13. The NANDC 14 executes data transfer between the RAM 13 and the NAND memory 20. The CPU 11 controls the entire memory controller 10 on the basis of the firmware program.

The firmware program is stored in, for example, the NAND memory 20. The firmware program is loaded to the RAM 13 upon booting. The CPU 11 is a circuit for realizing various kinds of functions on the basis of the firmware program loaded to the RAM 13. Various kinds of functions realized by the CPU 11 will be explained later.

Figure 2:
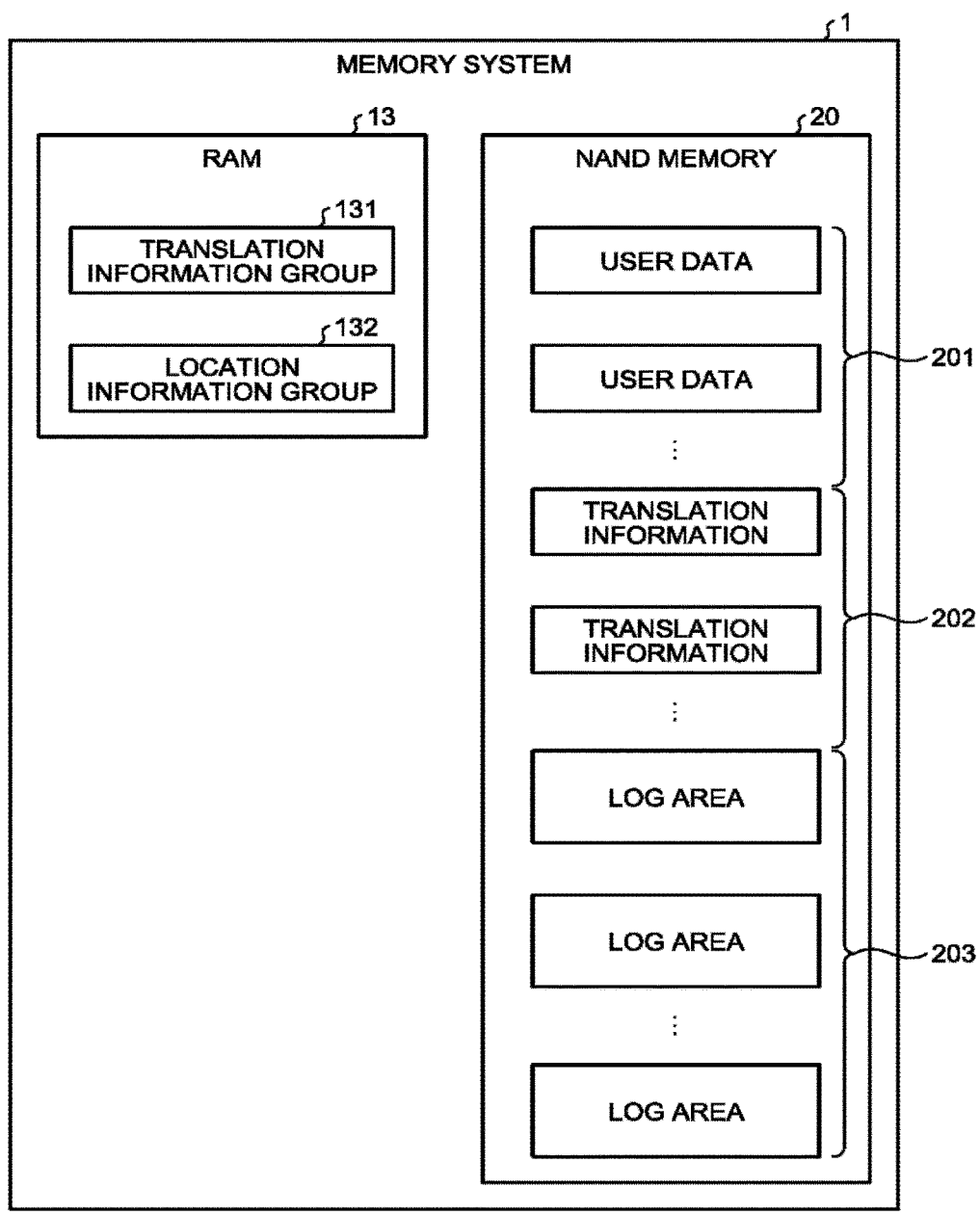
FIG. 2 is a figure illustrating an example of a configuration of a memory in the memory system according to the first embodiment.

FIG. 2 is a figure illustrating an example of a configuration of a memory in the memory system 1. The RAM 13 stores a translation information group 131 and a location information group 132. The NAND memory 20 stores one or more pieces of translation information 202 and one or more pieces of user data 201. Each piece of user data 201 is data sent together with a write request from the host 2 or written by garbage collection.

Figure 3:
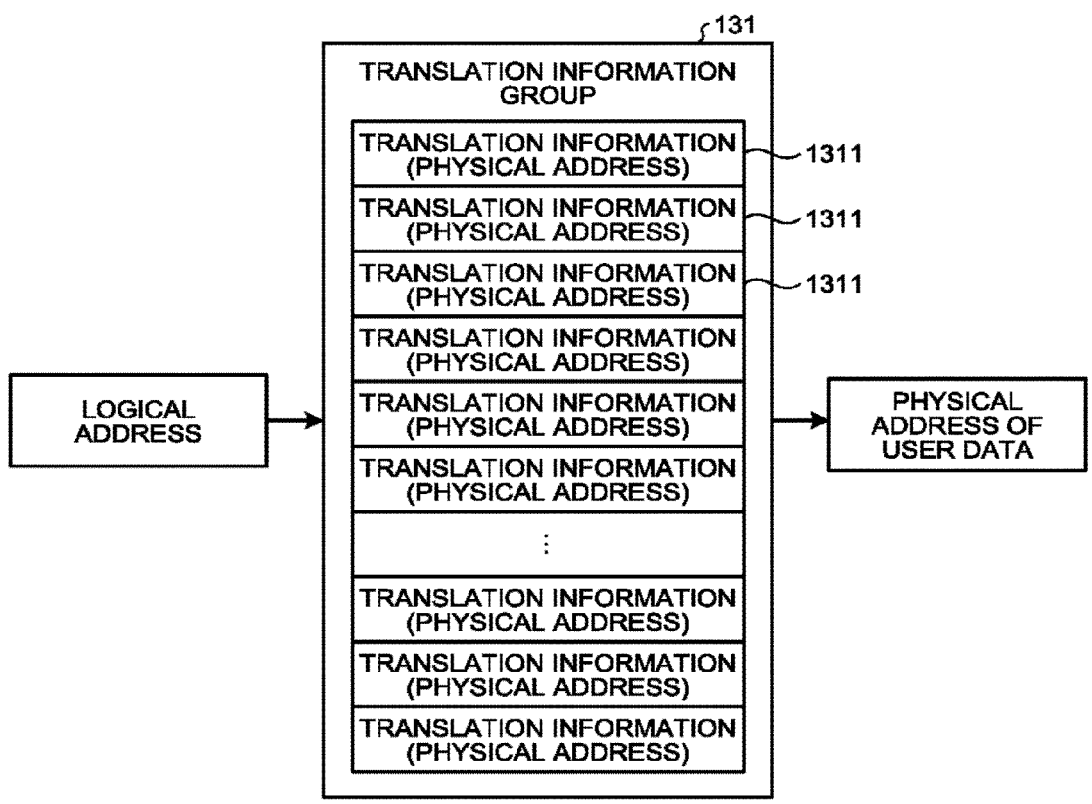
FIG. 3 is a figure illustrating an example of a data structure of a translation information group according to the first embodiment.

FIG. 3 is a figure illustrating an example of a data structure of the translation information group 131. The translation information group 131 includes a plurality of pieces of translation information 1311. A physical address is written in each piece of the translation information 1311. The pieces of the translation information 1311 are preferably arranged in the sequence of the logical address corresponding to the written physical address. More specifically, the translation information group 131 has a table-structure having a logical address as an index and a physical address indicating a location of a user data 201 corresponding to the logical address as a data item. The CPU 11 searches the translation information group 131 by using a logical address as a search key, so that the CPU 11 can obtain the physical address indicating the location in the NAND memory 20 for the user data 201 sent from the host 2 together with the location designation based on the logical address.

In response to writing of single user data 201 to the NAND memory 20, the corresponding translation information 1311 is updated. A physical address indicating a write destination location is written, in an overwriting manner, into the translation information 1311 corresponding to the logical address designating the location of the user data 201 which is written in the NAND memory 20.

Non-volatilization of each piece of translation information 1311 is executed in order not to lose the translation information group 131 from the RAM 13 upon the power supply interruption. More specifically, each piece of translation information 1311 is saved to the NAND memory 20. In this case, for example, it is supposed that each piece of translation information 1311 is copied to the NAND memory 20 in the non-volatilization. Multiple pieces of translation information 202 as shown in FIG. 2 are translation information non-volatilized from corresponding translation information 1311 stored in the RAM 13. It should be noted that each piece of translation information 1311 may be converted and stored to the NAND memory 20. More specifically, the format of each piece of translation information 1311 and the format of each piece of translation information 202 may be different from each other.

It should be noted that the state of the translation information 1311 in the RAM immediately after the update is dirty. "Dirty" indicates a state in which the content of the translation information 1311 is different from the content of the translation information 202 written in the NAND memory 20 by the last non-volatilization based on the translation information 1311. When dirty translation information 1311 is lost from the memory system 1, the user data 201 stored in the location indicated by the physical address mapped in the lost dirty translation information 1311 cannot be read by the host 2. Therefore, it is necessary to perform non-volatilization of the dirty translation information 1311. The CPU 11 controls the timing of the non-volatilization of the dirty translation information 1311 so that, even if a power supply interruption occurs at any moment, the dirty translation information 1311 is not to be lost. For example, upon the normal operation, the memory system 1 non-volatilizes some or all of the dirty translation information 1311 when the total amount of dirty translation information 1311 becomes more than a threshold value determined in advance. For example, the threshold value is determined based on the capacity of the capacitor 40 providing the electric power for allowing the memory system 1 to execute the emergency power off sequence after the power supply interruption. After the power supply interruption, the memory system 1 non-volatilizes all the dirty translation information 1311 as a part of the power off sequence (emergency power off sequence, normal power off sequence).

Figure 4:
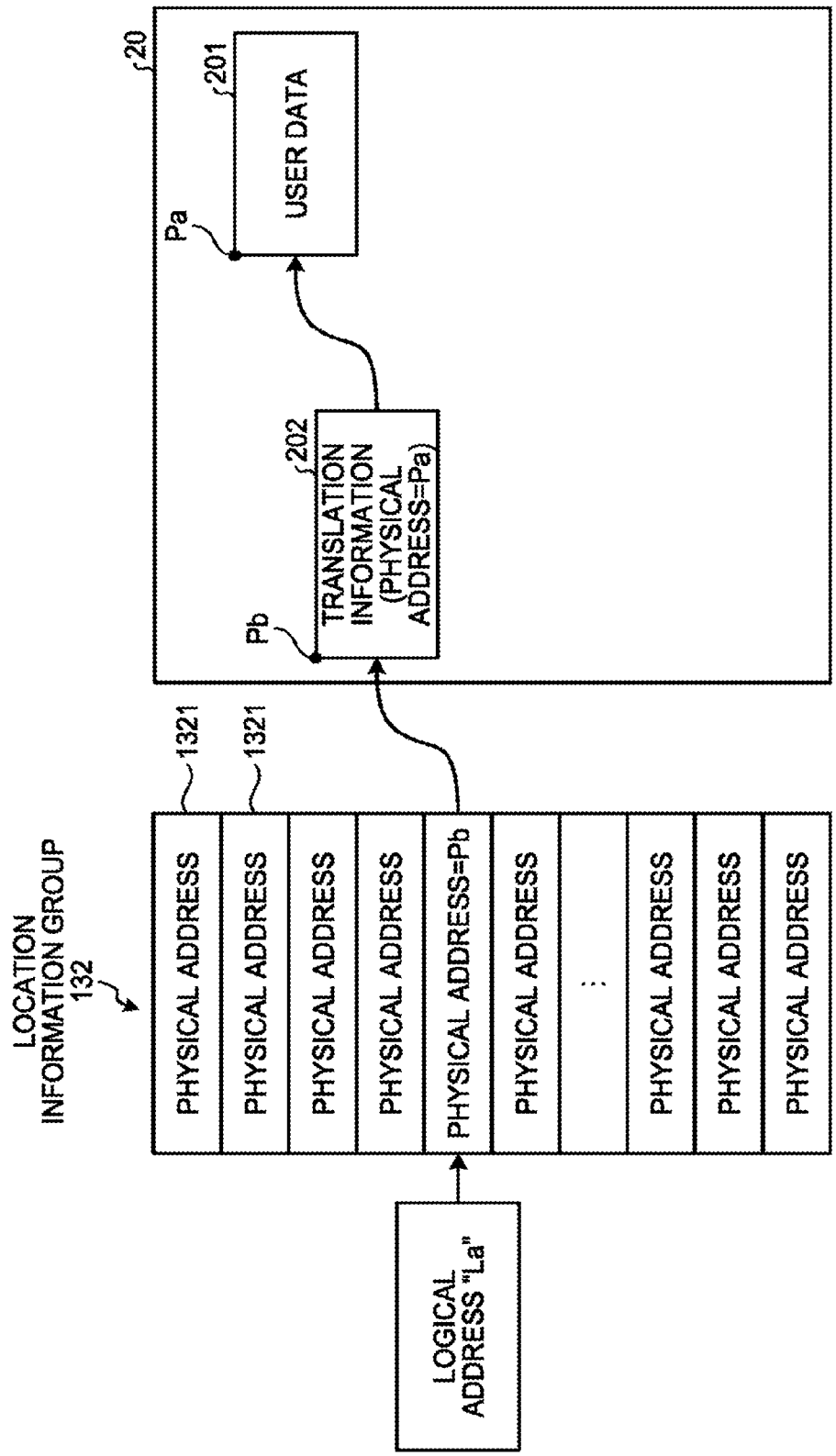
FIG. 4 is a figure illustrating an example of a data structure of a location information group according to the first embodiment.

FIG. 4 is a figure illustrating an example of data structure of the location information group 132. The location information group 132 includes a plurality of pieces of location information 1321. Each piece of location information 1321 corresponds to a piece of translation information 1311 included in the translation information group 131 in a one-to-one manner. More specifically, each piece of translation information 1311 included in the translation information group 131 corresponds to a piece of location information 1321 included in the location information group 132 in a one-to-one manner. The non-volatilization of a single piece of translation information 1311 may be executed a plurality of times upon the normal operation of the memory system 1. Therefore, there may be a plurality of pieces of translation information 202 corresponding to a single piece of translation information 1311 in the NAND memory 20. In each piece of location information 1321, the physical address of the location of the latest copy of the corresponding translation information 1311 is written. The latest copy indicates the translation information 202 stored in the NAND memory 20 by the last non-volatilization of one or more pieces of translation information 202 of the corresponding translation information 1311. The pieces of location information 1321 are arranged in the same order as the corresponding translation information 1311. More specifically, the location information group 132 has a configuration of a table having a logical address as an index and a physical address indicating a location of the translation information 202 as a data item. According to an example of FIG. 4, a logical address "La" is associated with a physical address "Pb" by one of the plurality of pieces of location information 1321 constituting the location information group 132. The translation information 202 to which the physical address "Pa" is written is stored to the location indicated by the physical address "Pb". This means that the user data 201 sent from the host 2 with the location designation of the logical address "La" are stored in the location indicated by the physical address "Pa".

The location information group 132 is lost from the RAM 13 by the power supply interruption. The log (log 204 (refer to FIG. 5)) is recorded in the NAND memory 20 so that the location information group 132 can be recovered to the RAM 13 after returning from the power supply interruption. Recovery of the location information group 132 means processing for returning at least the location information group 132 back to the state immediately before the power supply interruption. The state immediately before the power supply interruption indicates, for example, the state in which the translation information group 131 and the location information group 132 have been updated in response to all the user data 201 written to the NAND memory 20 before the power off sequence is completed. It should be noted that the recovery may also be referred to as restoring, rebuilding, reconstructing, or reconstituting. In this case, for example, the memory system 1 records a change in the location information group 132 as the log 204 in the NAND memory 20, and obtains the location information group 132 of the same state as the state immediately before the power supply interruption on the basis of the recorded log 204. The change in the location information group 132 corresponds to a change in the translation information group 131. A single log 204 is generated for every non-volatilization of single translation information 1311. In each log 204, the logical address as the index of the translation information 1311 which is the target of the non-volatilization and the physical address indicating the location of the write destination of the translation information 202 generated by the non-volatilization are associated with each other.

In the present embodiment, the logical address space of the memory system 1 is divided into a plurality of partial spaces. The location information group 132 is recovered in unit of the partial space. As a configuration for recovering the location information group 132 in the unit of the partial space, a log area 203 storing the logs 204 is separately allocated for every partial space in the NAND memory 20. More specifically, in the NAND memory 20, a plurality of log areas 203 are separately allocated. Each log area 203 is composed of, for example, one or more blocks.

Figure 5:
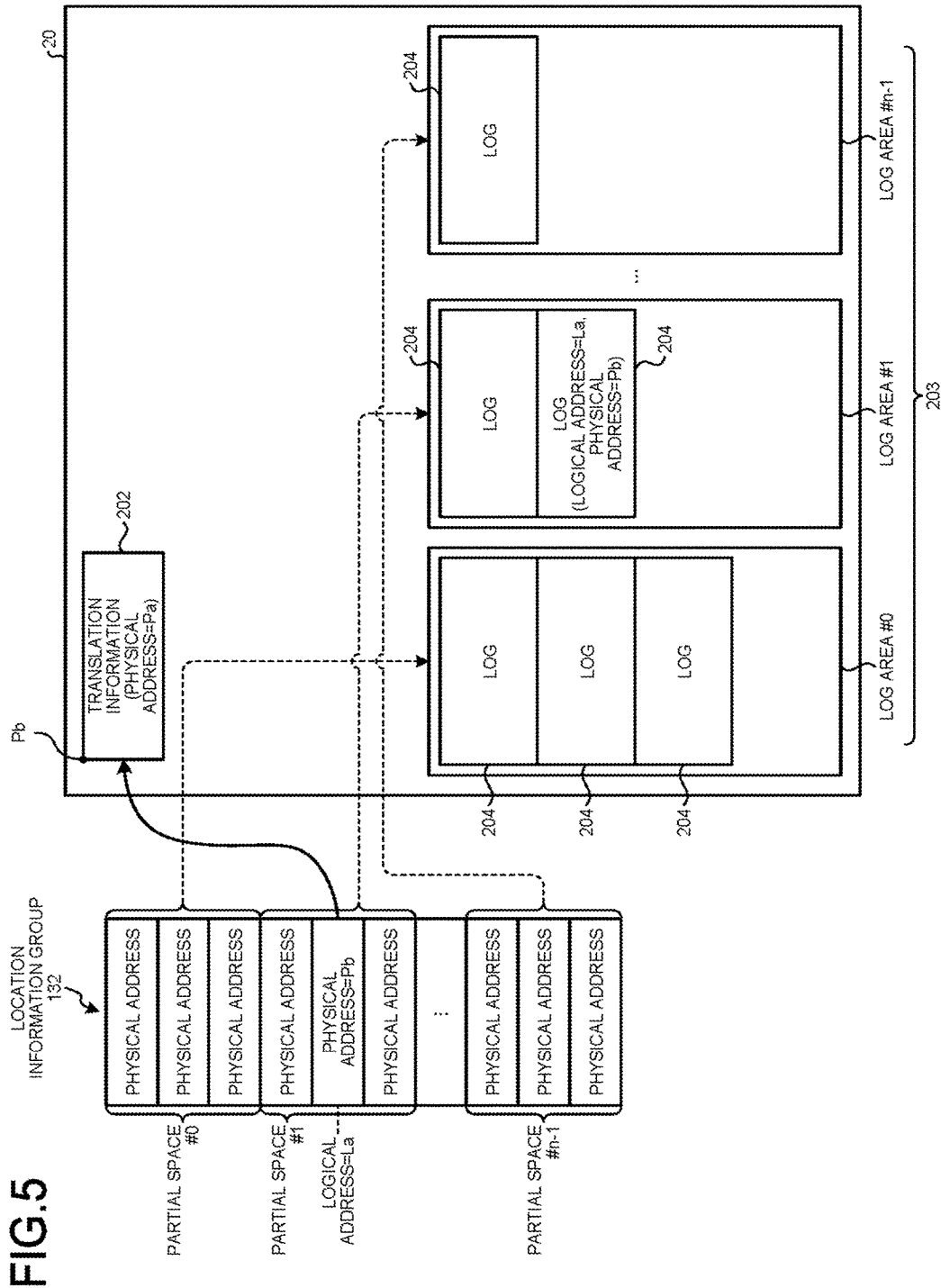
FIG. 5 is a figure for explaining a plurality of log areas according to the first embodiment.

FIG. 5 is a figure for explaining the plurality of log areas 203. In this case, the logical address space of the memory system 1 is divided into n partial spaces. Each of n partial spaces is identified by a number (#0 to #n−1). It should be noted that n log areas 203 are allocated in the NAND memory 20. Each of the n log areas 203 is identified by the number (#0 to #n−1). Each log area 203 corresponds to one of n partial spaces in a one to one manner. That is, each partial space corresponds to one of the n log areas 203 in a one to one manner. For example, a partial space #i (here, i is an integer satisfying 0≤i≤n−1) corresponds to a log area #i. In FIG. 5, an arrow of a dotted line indicates a relation between each log area 203 and a partial space to which each piece of location information 1321 belongs.

Here, in each of the partial spaces #0 to #n−1, the logical addresses are continuous. Therefore, the memory system 1 can identify a partial space to which a target logical address belongs, on the basis of predetermined bits in the more significant side of the target logical address. It should be noted that, as long as the partial space to which the target logical address belongs can be identified by the target logical address, the logical addresses may not be continuous in each of the partial spaces #0 to #n−1.

For another example, in a case where NVMe (R) is employed as an interface standard of communication between the memory system 1 and the host 2, the memory system 1 can provide a plurality of logical address spaces each of which identified by a name space ID. Each of the plurality of logical address spaces is referred to as a name space. Each partial space may be a single name space different from each other. In such case, each partial space can be identified by a name space ID.

For yet another example, the memory system 1 may divide a single logical address space into a plurality of partitions. Each partial space may be a partition different from each other. In such case, each partial space can be identified by an identifier of the partition.

In a case where a logical address "Lx" is included in a partial space #x, translation information 1311 for mapping the logical address "Lx" to a physical address will be denoted as translation information 1311 belonging to the partial space #x. Location information 1321 in which the location of the translation information 202 as the latest copy of the translation information 1311 belonging to the partial space #x is written will be denoted as location information 1321 belonging to the partial space #x. The log 204 generated in response to the non-volatilization of the translation information 1311 belonging to the partial space #x will be denoted as the log 204 belonging to the partial space #x. In a case where at least a single piece of location information 1321 which belongs to a partial space #x is unrecovered, the partial space #x is described as being unrecovered. "Location information 1321 is unrecovered" means that the location information 1321 has not yet been recovered. "Location information 1321 is recovered" means that, after the recovery from the power supply interruption, the location information 1321 in the same state as the state immediately before the power supply interruption has been stored at least once at the corresponding location in the location information group 132. Even if the location information 1321 in the same state as the state immediately before the power supply interruption is stored after the recovery from the power supply interruption, and thereafter the location information 1321 is updated, the location information 1321 is regarded as having been recovered. "When the location information 1321 is not recovered" means that, after the recovery from the power supply interruption, the location information 1321 in the same state as the state immediately before the power supply interruption has never been stored at the corresponding location in the location information group 132. In a case where the location information 1321 indicating the location of the translation information 1311 for mapping the logical address "Lx" is unrecovered, it may be described as the "logical address "Lx" is unrecovered". The translation information 1311 found in the translation information group 131 using the logical address "Lx" as the index may be described as the translation information 1311 of the logical address "Lx". The location information 1321 found in the location information group 132 using the logical address "Lx" as the index may be described as the location information 1321 of the logical address "Lx".

According to the example of FIG. 5, the logical address "La" belongs to the partial space #1. The physical address "Pb" is indicated by the location information 1321 of the logical address "La". The translation information 202 in which the physical address "Pa" is written is stored into the location indicated by the physical address "Pb". More specifically, the translation information 202 maps the logical address "La" to the physical address "Pa". When this translation information 202 is stored to the NAND memory 20, a log 204 for associating the logical address "La" and the physical address "Pb" is generated. The log 204 is stored into the head of the vacant area of the log area #1. The vacant area means an area where no information is stored. Each log 204 is generated in the same order as the order in which update of the corresponding location information 1321 is executed. In the log area #i, one or more logs 204 which belongs to the partial space #i are stored in the order of which the logs 204 are generated.

Figure 6:
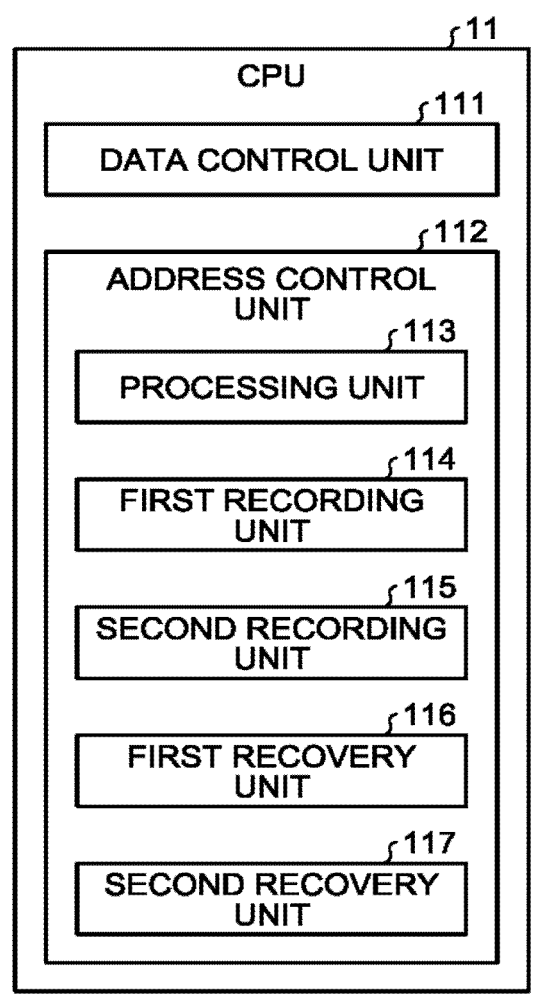
FIG. 6 is a figure illustrating a functional configuration achieved by a CPU on the basis of a firmware according to the first embodiment.

FIG. 6 is a figure illustrating a functional configuration realized by the CPU 11 on the basis of a firmware. The CPU 11 includes a data control unit 111 and an address control unit 112.

The data control unit 111 executes data transfer between the host 2 and the NAND memory 20. The data control unit 111 transmits a translation request to the address control unit 112 in order to obtain the location of the access destination. The translation request is a request for translating the logical address into the physical address to which the logical address is mapped. For example, the translation request includes a logical address included in the access request.

The address control unit 112 includes a processing unit 113, a first recording unit 114, a second recording unit 115, a first recovery unit 116, and a second recovery unit 117. The processing unit 113 executes processing for translating the logical address into the physical address. The first recording unit 114 executes update of the translation information group 131 and the non-volatilization of each piece of translation information 1311. The second recording unit 115 executes recording of the log 204 and update of the location information group 132. The first recovery unit 116 executes the recovery of the location information group 132. The second recovery unit 117 executes the recovery of the translation information group 131. The recovery of the translation information group 131 means storing a part or all of the translation information group 131 in the same state as the state immediately before the power supply interruption after the recover from the power supply interruption.

It should be noted that some or all of the data control unit 111, the processing unit 113, the first recording unit 114, the second recording unit 115, the first recovery unit 116, and the second recovery unit 117 may be realized by hardware or a combination of software and hardware.

Figure 7:
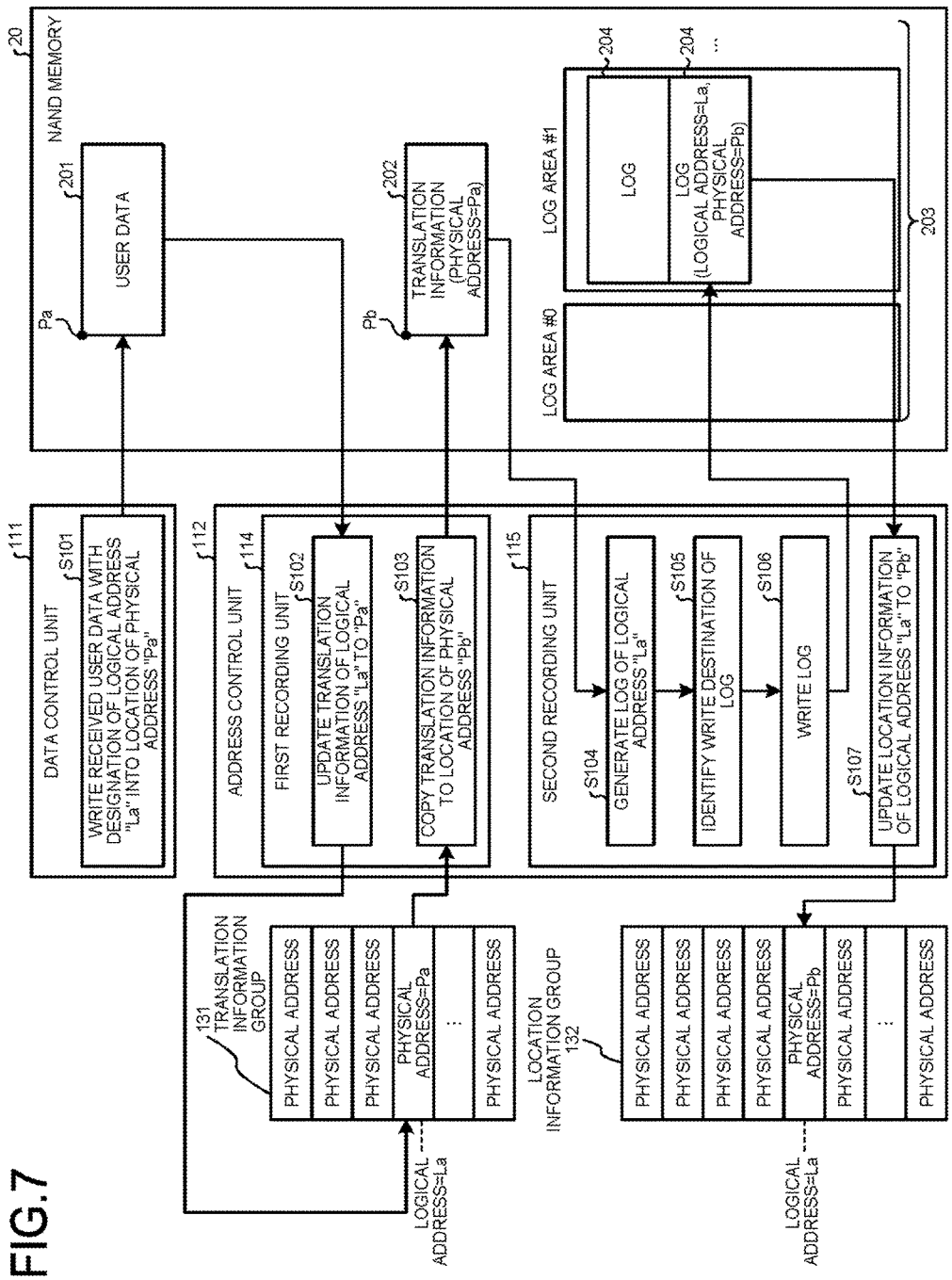
FIG. 7 is a figure for explaining operation of non-volatilization according to the first embodiment.

FIG. 7 is a figure for explaining operation of non-volatilization. In the figure, an arrow indicates a flow of information or a flow of processing. When the user data 201 which is received from the host 2 designating to the logical address "La" is written by the data control unit 111 to the NAND memory 20 (S101), the first recording unit 114 updates the translation information 1311 about the logical address "La" (S102). More specifically, in a case where the physical address of the write destination of the processing of S101 is "Pa", the first recording unit 114 writes the physical address "Pa" to the translation information 1311 about the logical address "La" in an overwriting manner.

When the timing of the non-volatilization has come, the first recording unit 114 non-volatilizes the translation information 1311 regarding the logical address "La" to the NAND memory 20 (3103). Then, the second recording unit 115 generates a log 204 (S104). For example, the translation information 1311 regarding the logical address "La" is written in the location indicated by the physical address "Pb" by the processing of S103, the second recording unit 115 generates a log 204 for associating the logical address "La" and the physical address "Pb" in the processing of S104.

Subsequently, the second recording unit 115 identifies the log area 203 of the destination for the log 204 generated in the processing of S104 (S105). In this case, the log 204 generated in the processing of S104 belongs to the partial space #1. Therefore, the second recording unit 115 identifies the log area #1 as the log area 203 of the destination for the log 204 generated in the processing of S104. The second recording unit 115 stores the log 204 generated in the processing of S104 to the head of the vacant area into the log area 203 identified (S106). Then, the second recording unit 115 updates the location information 1321 of the logical address "La" (S107). More specifically, the second recording unit 115 writes the physical address "Pb" to the location information 1321 of the logical address "La" in an overwriting manner.

The operation of the non-volatilization of a single piece of translation information 1311 is terminated in the processing of S107. In the explanation about this case, the location information 1321 is updated after the log 204 is updated. Alternatively, the location information 1321 may be updated before or after the log 204 is generated or before the log 204 is stored.

Figure 8:
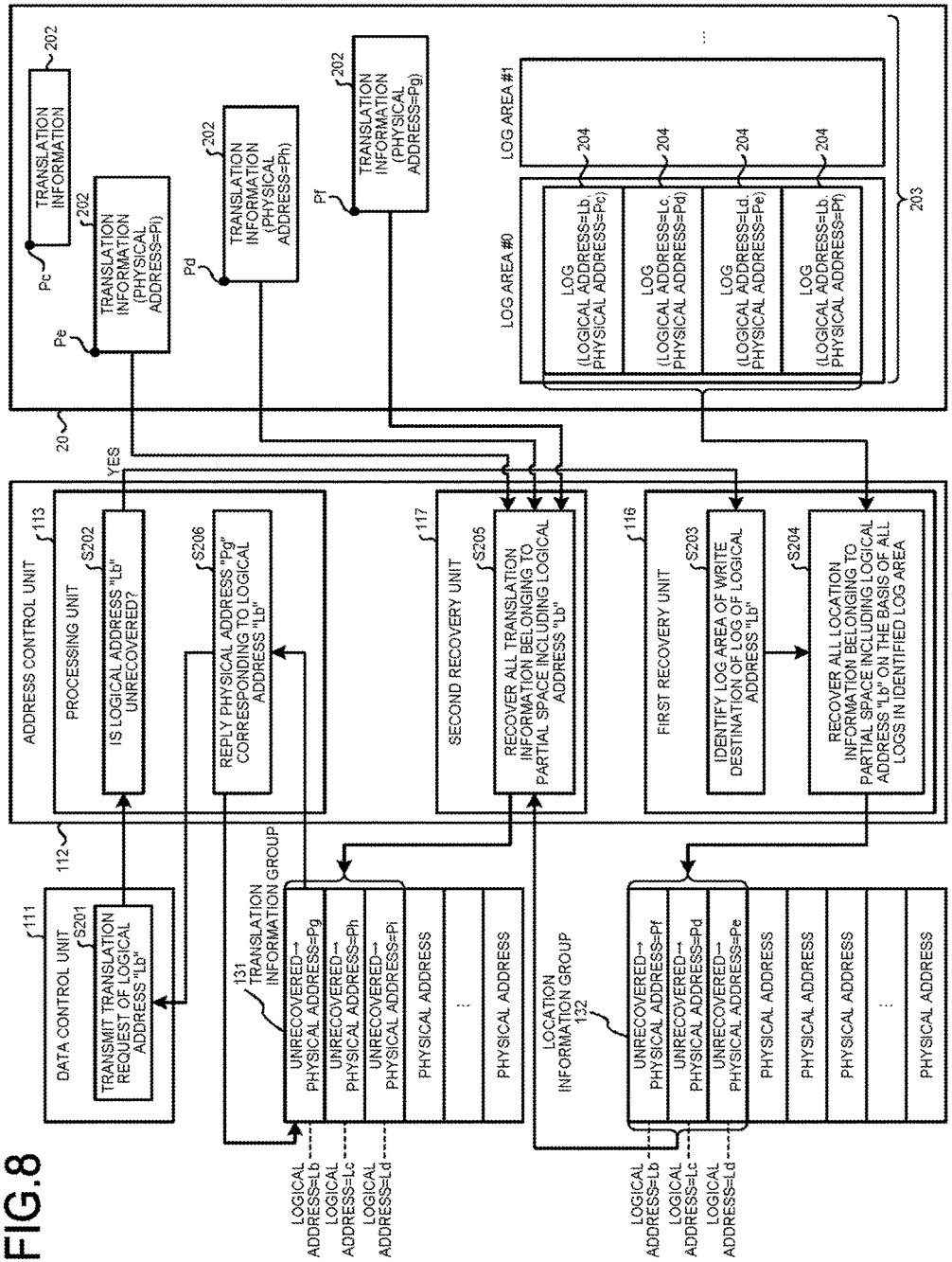
FIG. 8 is a figure for explaining operation of on-demand recovery according to the first embodiment.

In the first embodiment, after returning from the power supply interruption, automatic recovery is not executed. The recovery of at least the translation information 1311 and the location information 1321 which belong to the unrecovered partial space is started with, as a trigger, the attempt to use the translation information 1311 which belongs to the unrecovered partial space. The use includes reference or update. A recovery of information regarding the partial space started with, as a trigger, the attempt to use the translation information 1311 will be denoted as an on-demand recovery. FIG. 8 is a figure for explaining operation of the on-demand recovery. It should be noted that, in this case, not only the location information 1321 but also the translation information 1311 are recovered in the unit of the partial space in the on-demand recovery.

First, the data control unit 111 transmits a translation request to the address control unit 112 (S201). In the explanation about this case, a translation request of a logical address "Lb" belonging to a partial space #0 is transmitted. Here, the partial space #0 is considered to be unrecovered. Subsequent to the processing of S201, the processing unit 113 determines whether or not the logical address "Lb" which is the target of the translation is unrecovered (S202). "A logical address is unrecovered" means that translation information 1311 which includes the logical address as an index and which is in the same state as the state immediately before the power supply interruption has never been stored since the memory system 1 had returned from the power supply interruption.

Any given method can be employed as the method of S202. For example, immediately after the recovery from the power supply interruption, the first recovery unit 116 generates a location information group 132 in which an initial value with a magic number that cannot be used as a physical address is written in all the entries. In a recovery for each of the partial spaces, the initial value is overwritten with the physical address that has been written before the power supply interruption. According to on-demand recovery, not only the location information 1321 but also the translation information 1311 are recovered in the unit of the partial space. Therefore, the processing unit 113 determines whether the initial value is written in the location information 1321 of the logical address "Lb", so that the processing unit 113 can determine whether the logical address "Lb" which is to be translated is unrecovered.

According to another example of the method of S202, the second recovery unit 117 generates the translation information group 131 in which an initial value that cannot be used as a physical address is written in all the entries, immediately after the recovery from the power supply interruption. In a recovery for each of the partial spaces, the initial value is overwritten by the physical address that has been written before the power supply interruption. The processing unit 113 determines whether the initial value is written in the translation information 1311 of the logical address "Lb", so that the processing unit 113 can determine whether the logical address "Lb" which is to be translated is unrecovered.

According to another example of the method of S202, the processing unit 113 manages, for each partial space, the information in which whether the translation information group 131 is recovered or not is written. The processing unit 113 refers to the information in which whether the translation information group 131 is recovered or not is written, so that the processing unit 113 can determine whether the logical address "Lb" which is to be translated is unrecovered.

In the explanation about FIG. 8, the logical address "Lb" which is the target of the translation is considered to be unrecovered. In a case where the logical address "Lb" which is the target of the translation is determined to be unrecovered, the first recovery unit 116 identifies the log area 203 corresponding to the partial space including the logical address "Lb" (S203). Since the logical address "Lb" is included in the partial space #0, the log area #0 is identified in the processing of S203. The first recovery unit 116 recovers all pieces of location information 1321 belonging to the partial space #0 including the logical address "Lb" on the basis of all the logs 204 stored in the identified log area #0 (S204).

Any method may be employed as the method of recovery of the location information 1321 in the unit of the partial space. For example, the first recovery unit 116 reads each of all the logs 204 stored in the log area #0 in the same sequence as the sequence in which the logs 204 are stored, and writes, in an overwriting manner, the physical address recorded in the log 204 to the location corresponding to the logical address recorded in the log 204 in the location information group 132.

In another example of the method of recovering the location information 1321 in the unit of the partial space, the first recovery unit 116 reads each of all the logs 204 stored in the log area #0 in the sequence opposite to the sequence in which the logs 204 are stored. On every reading of the log 204, the first recovery unit 116 determines whether the physical address is already written to the location corresponding to the logical address recorded in the log 204 in the location information group 132. In a case where the physical address is determined not to be already written to the location corresponding to the logical address recorded in the log 204 in the location information group 132, the first recovery unit 116 writes the physical address recorded in the log 204 to the location corresponding to the logical address. In a case where a physical address has already been written in the location corresponding to the logical address recorded in the log 204 in the location information group 132, the first recovery unit 116 recognizes that the location information 1321 having the logical address as an index has already been recovered, and does not write the physical address recorded in the log 204. The first recovery unit 116 keeps on reading the logs 204 until all the pieces of location information 1321 have been recovered.

In the case of the present embodiment in which a mechanism of a snapshot (explained later) is not employed, the logs 204 of the latest generation of all the logical addresses are required in order to recover all the pieces of location information 1321. In the NAND memory 20, a storage area for the translation information 1311 and each of the log areas 203 having a size capable of storing at least the translation information 1311 of the latest generation and the log 204 of the latest generation are allocated for all the logical addresses. It should be noted that the design of the sizes of the storage area for the translation information 1311 and each of the log areas 203 are not limited to the above.

The first recovery unit 116 does not need to read all the logs 204 in each of the log areas 203 as long as, for all the logical addresses, the log 204 of the latest generation is confirmed to have been reflected. For example, in a case where the first recovery unit 116 reads each of all the logs 204 in the sequence opposite to the sequence in which the logs 204 have been stored, the first recovery unit 116 counts unrecovered pieces of location information 1321, and in a case where the count value becomes equal to zero, the recovery may be terminated.

The RAM 13 may be configured by a combination of a large capacity DRAM and a small capacity SRAM. The speed for writing into the DRAM is faster than the speed for writing into the NAND memory 20, but is slower than the speed for writing into the SRAM. The first recovery unit 116 may once recover the location information 1321 in the unit of the partial space on the SRAM, and may copy the recovered location information 1321 in the unit of the partial space to the DRAM. In this case, the amount of writing location information 1321 to the DRAM is less than the amount of writing location information 1321 in a case where the location information 1321 in the unit of the partial space is recovered on the DRAM. Therefore, it takes less time to recover the location information 1321 in the unit of the partial space.

After the processing of S204, the second recovery unit 117 recovers all the translation information 1311 belonging to the partial space #0 on the basis of all the location information 1321 belonging to the partial space #0 (S205). According to the location information group 132, the translation information 202 about the logical address "Lb" is stored to the location indicated by the physical address "Pf". The second recovery unit 117 reads the translation information 202 about the location corresponding to the logical address "Lb" from the location indicated by the physical address "Pf", and recovers the translation information 202 in the translation information group 131. According to the location information group 132, the translation information 202 about the logical address "Lc" is stored at the location indicated by the physical address "Pd". The second recovery unit 117 reads the translation information 202 about the location corresponding to the logical address "Lc" from the location indicated by the physical address "Pd", and recovers the translation information 202 in the translation information group 131. According to the location information group 132, the translation information 202 about the logical address "Ld" is stored at the location indicated by the physical address "Pe". The second recovery unit 117 reads the translation information 202 about the location corresponding to the logical address "Ld" from the location indicated by the physical address "Pe", and recovers the translation information 202 in the translation information group 131.

After the processing of S205, the processing unit 113 refers to the translation information group 131, thereby obtaining the physical address "Pg" corresponding to the logical address "Lb", and responds the obtained physical address "Pg" to the data control unit 111 (S206).

In this explanation, with the on-demand recovery, not only the location information 1321 but also the translation information 1311 are recovered in the unit of the partial space. Alternatively, the second recovery unit 117 may be configured such that, after the location information 1321 is recovered in the unit of the partial space, only the translation information 1311 of the logical address requested by the translation request may be recovered.

In this explanation, the on-demand recovery is executed in response to an access request from the host 2. The on-demand recovery may also be executed when processing of translation occurs in the internal processing of the memory system 1. For example, the internal processing includes garbage collection, refresh, or wear levelling.

The garbage collection is processing for moving (copying) at least valid user data 201 from a single block to a vacant area of another block, and thereafter, regarding, as invalid data, all the user data 201 stored in the source block from which the user data 201 were moved. The source block from which the user data 201 were moved is regarded as a free block after the garbage collection. In each free block, erase operation is executed, so that the free block is made into such a state that no data is stored and new data can be programmed into. The memory controller 10 updates the corresponding translation information 1311 in response to the copying of the valid user data 201. The memory controller 10 executes the on-demand recovery in a case where the translation information 1311 of the update target is unrecovered in the garbage collection.

It should be noted that the user data 201 stored in the NAND memory 20 is in either of the valid state and the invalid state. It is considered a case where second user data 201 is received from the host 2 designated to the same logical address as first user data 201 designated to, in the state where the first user data 201 has already been stored in the NAND memory 20. In this case, the memory controller 10 writes the second user data 201 to a block having a vacant page, and then manages the first user data 201 as invalid user data 201. Here, a "vacant" state is a state in which any data including the invalid user data 201 and the valid user data 201 is not stored. More specifically, "the vacant page" means a vacant area to which data can be written. Writing to the NAND memory 20 is performed according to such a method, and therefore, each block can store the invalid user data 201 and the valid user data 201. "Data is valid" means that the data is in the latest state. In a case where multiple pieces of user data 201 sent multiple times designated to the same logical address are stored to the NAND memory 20, the latest state is a state of a single piece of the multiple pieces of user data 201 that has been sent most recently from the host 2. In a case where the user data 201 that has been sent most recently from the host 2 is copied in garbage collection, a single piece of user data 201 that has been generated most recently in the copying process is the latest state. The invalid user data 201 is one of the multiple pieces of user data 201 other than the piece of user data 201 that has been sent most recently from the host 2, or in a case where the user data 201 that has been sent most recently from the host 2 is copied in the garbage collection, the invalid user data 201 is user data 201 other than the user data 201 generated most recently in the copying process.

The refresh is processing for once reading the user data 201 stored in the NAND memory 20, and programming the user data 201 again in the NAND memory 20. The NAND memory 20 includes a memory cell array constituted by multiple memory cell transistors (memory cells). Upon programming, the threshold voltage of each memory cell is controlled to be within a range according to a data value. The relationship between the range of the threshold voltage and the data value is defined in advance. However, after the programming, the threshold voltage of the memory cell may change as the time elapses or on every access. When the threshold voltage changes, the data value programmed in the memory cell may change. The changed data value is detected as an error, the data value is corrected to a data value by an error correction function, and the corrected data is programmed. Capability of the error correction function has a limitation. In order to prevent the number of errors from exceeding the limitation of the capability of the error correction function, the programmed user data 201 is refreshed at certain timing. With the refresh, the user data 201 moves between blocks. By the movement, the memory controller 10 uses the corresponding translation information 1311. When the memory controller 10 uses the translation information 1311 in the process of wear levelling and the translation information 1311 is unrecovered, the memory controller 10 executes the on-demand recovery.

The wear levelling is processing for levelling the number of program/erase cycles in each block among the plurality of blocks. One of wear levelling includes processing for moving the valid user data 201 among blocks. When the valid user data 201 are moved, the memory controller 10 uses the corresponding translation information 1311. The memory controller 10 executes the on-demand recovery in a case where the translation information 1311 is used in the course of the wear levelling and the translation information 1311 is found to be unrecovered.

Therefore, according to the first embodiment, the memory controller 10 does not continuously recover all the location information 1321 belonging to the location information group 132, and instead, the memory controller 10 recovers the location information group 132 for every partial space. In other words, from when the recovery of a partial space is completed to when the recovery of another partial space is started, the memory controller 10 can execute any given processing different from the recovery (for example, reception of another access request, processing of another access request, or the like). In the first embodiment, the recovery of each partial space is executed respectively on demand. The memory controller 10 can return a response to the access request to the host 2 without recovering all the address spaces. Therefore, the memory controller 10 can return a response to the access request in a shorter time as compared with the case where all the location information 1321 belonging to the location information group 132 are continuously recovered. "All the location information 1321 belonging to the location information group 132 are continuously recovered" means that any given processing different from the recovery (for example, reception of another access request, processing of another access processing, or the like) is not permitted to be executed from when the recovery of the location information group 132 is started to when the recovery of the location information group 132 is finished.

In a case where the recovery of the location information group 132 is started automatically immediately after the booting, a request from the host 2 cannot be processed before the recovery of the location information group 132 is completed. In the first embodiment, "the recovery of the location information group 132 is started automatically immediately after the booting" means that the recovery of the location information group 132 is started when a condition in which the memory system 1 begins to boot is satisfied. According to the first embodiment, the memory controller 10 does not automatically start the recovery of the location information group 132 immediately after the booting, and instead, the memory controller 10 executes the recovery of the location information group 132 for every partial space in response to attempt to use the translation information group 131. Therefore, after the booting, the memory controller 10 can start a processing according to a request from the host 2 in a shorter time as compared with the case where the recovery of the location information group 132 is automatically started immediately after the booting.

The plurality of log areas 203 are separately allocated in the NAND memory 20 as the areas for storing the logs 204. A log 204 belonging to a partial space #a and a log 204 belonging to a partial space #b which is the partial space different from the partial space #a are stored in log areas 203 different from each other. The recovery in the unit of the partial space can be performed by using a log 204 read from a single log area 203, and therefore, it is easy to execute the recovery of the location information group 132 in the unit of the partial space.

It should be noted that the plurality of log areas 203 may not be allocated separately. For example, without distinguishing the partial space from each other, all the logs 204 may be stored in a single log area 203. Each log has information which specifies the partial space to which the log belongs (partial space information). In the recovery of the location information group 132, the memory controller 10 selects and uses only the log 204 belonging to a partial space of a recovery target on the basis of the partial space information.

(Second Embodiment)

According to a second embodiment, a memory system 1 can automatically start recovery of a location information group 132 based on a temporal condition. The recovery that is started automatically will be referred to as background recovery. The second embodiment as well as the first embodiment are applied to, for example, the memory system 1.

Figure 9:
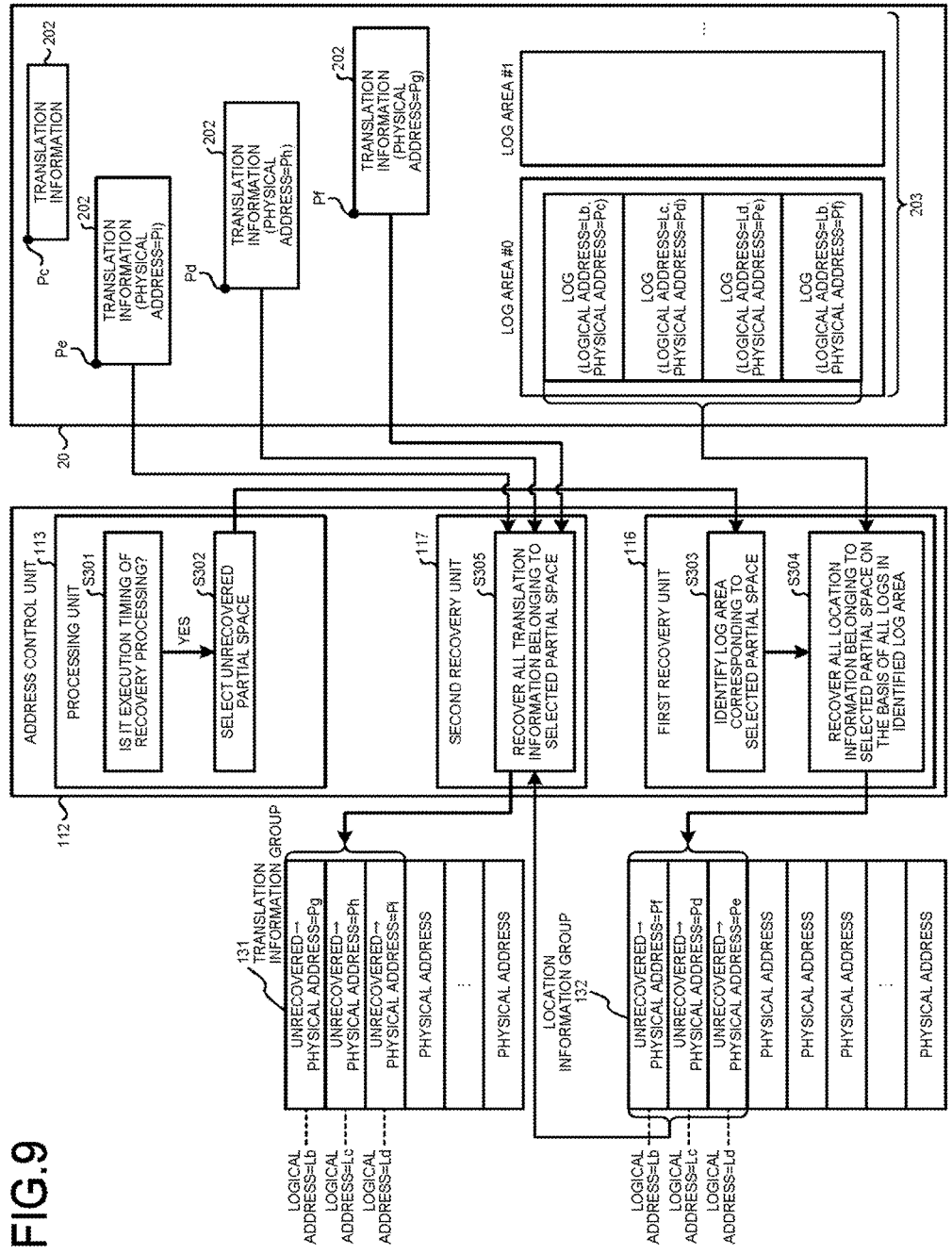
FIG. 9 is a figure for explaining operation of background recovery according to a second embodiment.
Figure 11:
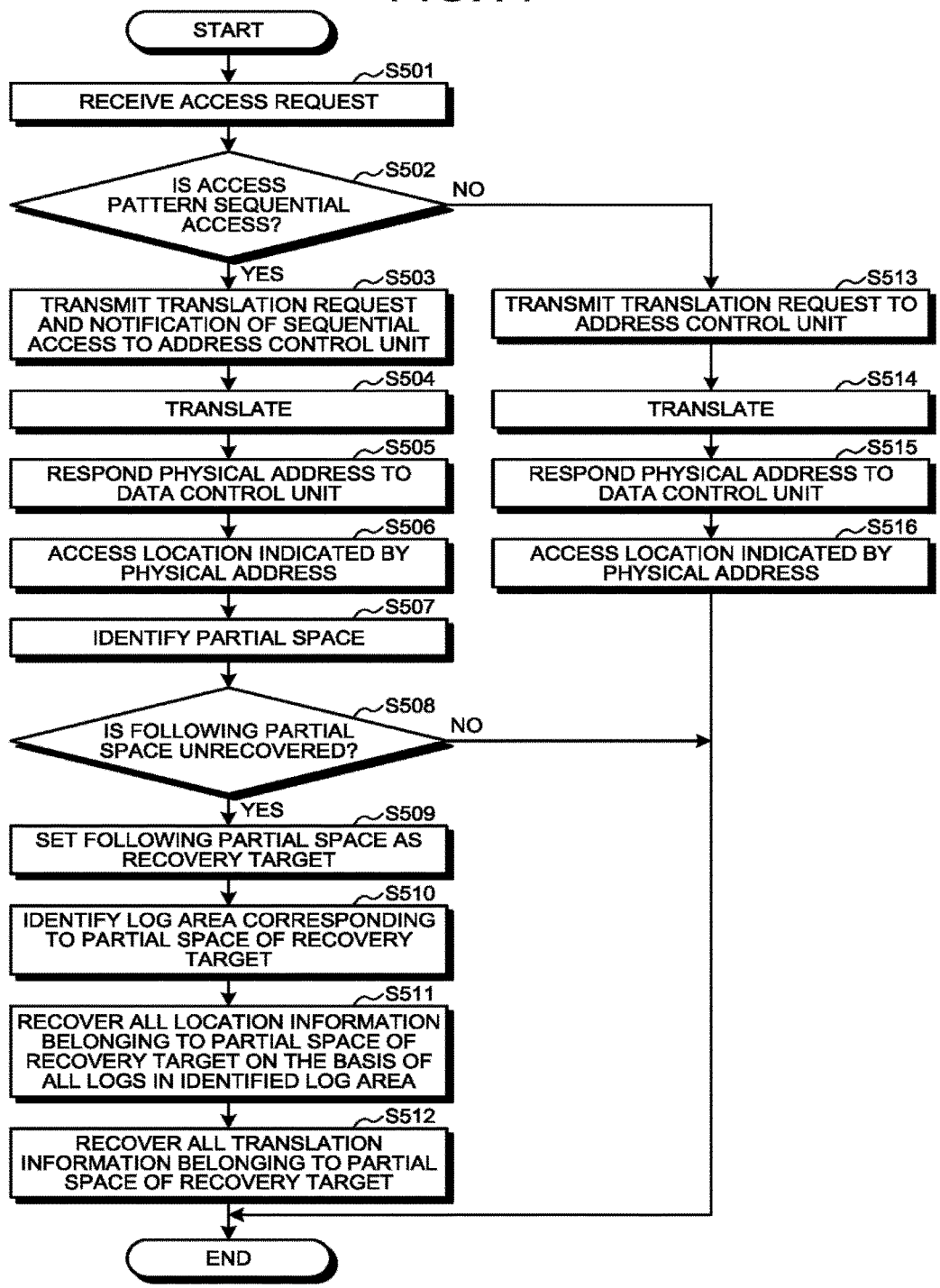
FIG. 11 is a figure for explaining operation of prefetch recovery according to a fourth embodiment.

FIG. 9 is a figure for explaining operation of background recovery. It should be noted that a processing unit 113 determines whether there is an unrecovered partial space or not. In the example of FIG. 11, a case where there remains an unrecovered partial space will be explained.

First, the processing unit 113 determines whether it is execution timing of the background recovery (S301). When it is not yet the execution timing of the background recovery, the processing unit 113 executes the processing of S301 again.

For example, when a threshold time has elapsed since the last background recovery has been completed, the processing unit 113 determines that it is the execution timing of the background recovery. The processing unit 113 measures the elapsed time by using, for example, a software timer or a hardware timer. For example, when the threshold time has elapsed since the processing other than the background recovery had been completed, the processing unit 113 determines that it is the execution timing of the background recovery.

For example, when the state of the memory system 1 is the idle state, the processing unit 113 determines that it is the execution timing of the background recovery. The idle state is a state in which none of the processing in response to the request from the host 2 nor the internal processing is being executed. If it is determined that a predetermined processing among all the processing is not being executed, for example, the processing unit 113 determines that it is the execution timing of the background recovery.

When it is the execution timing of the background recovery, the processing unit 113 selects one unrecovered partial space (S302). In this case, the partial space #0 is assumed to be selected. The first recovery unit 116 identifies the log area #0 corresponding to the selected partial space #0 (S303). Then, like the processing of S204 of FIG. 8, the first recovery unit 116 recovers all the location information 1321 belonging to the partial space #0 on the basis of all the logs 204 stored in the identified log area #0 (S304).

After the processing of S304, the second recovery unit 117 recovers all the translation information 1311 belonging to the partial space #0 on the basis of all the location information 1321 belonging to the partial space #0 like the processing of S205 of FIG. 8 (S305). In a case where there still remains an unrecovered partial space after the processing of S305, the processing of S301 is executed again.

As described above, according to the second embodiment, the memory controller 10 can automatically start the recovering of the partial spaces. The memory controller 10 can execute any given processing different from the recovery (for example, processing of another access request and the like) from when the background recovery is completed to when subsequent background recovery is started. The recovery of the partial spaces is performed automatically without using the translation information 1311, and therefore, frequency of executing the on-demand recovery is suppressed, and as a result, the overhead due to the execution of the on-demand recovery is reduced.

(Third Embodiment)

According to a third embodiment, a memory system 1 starts recovery of location information group 132 on the basis of a request from a host 2 (hereinafter referred to as a recovery request).

Figure 10:
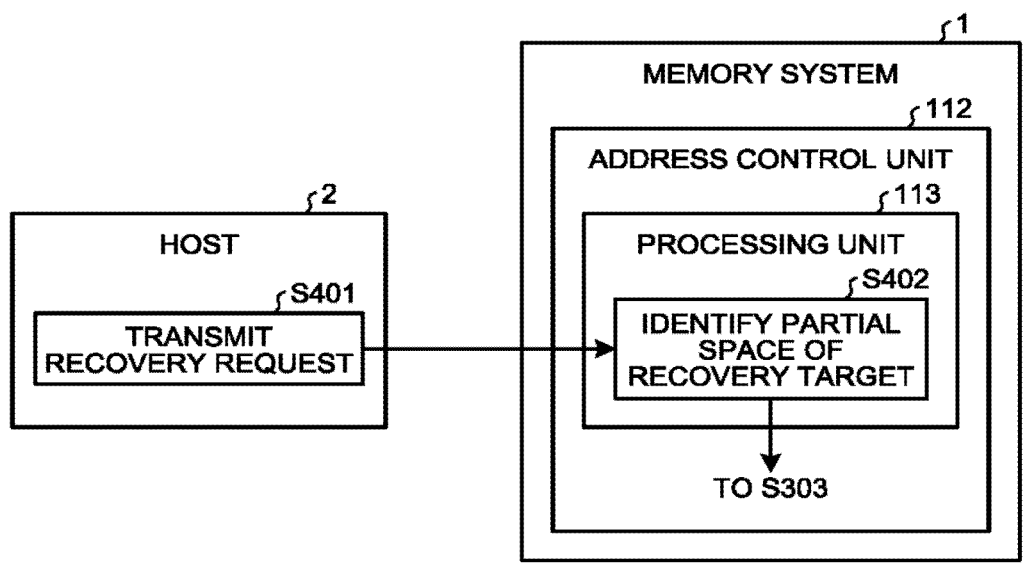
FIG. 10 is a figure for explaining operation of recovery in response to a recovery request according to a third embodiment.

FIG. 10 is a figure for explaining operation of recovery according to a recovery request.

First, the host 2 transmits a recovery request (S401). When the memory system 1 receives the recovery request, the processing unit 113 identifies a recovery target partial space in the memory system 1 (S402). The range of the recovery target logical address is designated by the range of the logical address or the logical address in the recovery request. In a case where the range of the recovery target logical address is included in the recovery request, the processing unit 113 identifies the recovery target partial space on the basis of the range of the recovery target logical address included in the recovery request. When there are a plurality of recovery target partial spaces, the subsequent processing on the plurality of partial spaces is executed. In a case where the range of the recovery target logical address is designated by the logical address, the processing unit 113 identifies the partial space including the designated logical address as the recovery target.

Subsequently, with regard to the identified partial space, the same processing as the processing of S303 to S305 of FIG. 9 are executed.

As described above, the memory controller 10 performs the recovery of the partial space on the basis of the recovery request from the host 2, and therefore, in a case where the recovery request is received from the host 2 in advance and thereafter the access request is received, a response to the access request can be returned in a shorter time.

It should be noted that the recovery request may designate the recovery target partial space using a name space ID.

(Fourth Embodiment)

According to a fourth embodiment, in a case where the memory system 1 receives a plurality of access requests corresponding to an access pattern of a sequential access, the memory system 1 executes recovery of a partial space that follows an access destination partial space. It should be noted that "following the access destination partial space" means that "neighboring at least at the side where the logical address is larger than the access destination partial space". There may be a gap or there may not be any gap between the access destination partial space and the partial space following the access destination partial space. A recovery of the partial space following the access destination partial space is expressed as a prefetch recovery. It should be noted that the sequential access means such an access pattern that access destinations of the plurality of access requests issued successively are continuous on the logical address space. Noted that, in a case where the memory system 1 receives the plurality of access requests corresponding to the access pattern of the sequential access in descending order, the memory system 1 may executes recovery of a partial space neighboring at the side where the logical address is smaller than the access destination partial space.

FIG. 11 is a figure for explaining operation of prefetch recovery. When the memory system 1 receives an access request from the host 2 (S501), the memory system 1 determines whether or not a pattern of the access based on the access requests received from the host 2 corresponds to a sequential access (S502).

For example, the data control unit 111 memorizes a particular number of access requests received recently. In a case where the memory system 1 is connected to a plurality of hosts 2, the data control unit 111 memorizes a particular number of access requests separately for each host 2. The data control unit 111 determines whether or not a range of access destinations of each of the access request transmitted in the processing of S501 and the memorized particular number of access requests is continuous on the logical address space. In a case where the range of the access destinations of each of the access request transmitted in the processing of S501 and the memorized particular number of access requests is determined to be continuous on the logical address space, the data control unit 111 determines that the pattern of the access based on the access request newly received from the host 2 in the processing of S501 corresponds to a sequential access. In a case where the range of the access destination of each of the access request newly received from the host 2 in the processing of S501 and the memorized particular number of access requests is determined not to be continuous on the logical address space, the data control unit 111 determines that the pattern of the access based on the access request newly received from the host 2 in the processing of S501 does not correspond to a sequential access. It should be noted that the determination method in S502 is not limited to only the above method.

In a case where the pattern of the access based on the access request newly received from the host 2 in the processing of S501 corresponds to a sequential access (S502, Yes), the data control unit 111 transmits a translation request and a notification of a sequential access to the address control unit 112 (S503). In the address control unit 112 having received them, the processing unit 113 translates the logical address requested in the translation request into the physical address on the basis of the translation information group 131 (S504), and responds the physical address obtained by the translation to the data control unit 111 (S505). In a case where the logical address requested in the translation request is unrecovered, the address control unit 112 executes the on-demand recovery, and thereafter executes the processing of S504. The data control unit 111 access the location indicated by the physical address included in the response from the address control unit 112 (S506).

Further, the processing unit 113 identifies the partial space to which the logical address requested in the translation request belongs (S507). The processing unit 113 determines whether the partial space following the identified partial space on the logical address space (hereinafter following partial space) is unrecovered or not (S508). In a case where the following partial space is unrecovered (S508, Yes), the address control unit 112 sets the following partial space as the recovery target (S509). Then, with regard to the recovery target partial space, the same processing as the processing of S303 to S305 is executed in S510 to S512, and the operation is terminated. In a case where the subsequent partial space is not unrecovered (S508, No), the operation is terminated.

In a case where the pattern of the access based on the access request newly received from the host 2 in the processing of S501 does not correspond to a sequential access (S502, No), the data control unit 111 transmits a translation request to the address control unit 112 (S513). Then, the same processing as the processing of S504 to S506 is executed in S514 to S516, and the operation is terminated.

As described above, according to the fourth embodiment, in a case where the memory controller 10 receives an access request based on the access pattern of the sequential access and the partial space following, on the logical address space, the partial space to which the translation information 1311 of the access target belongs is unrecovered, the memory controller 10 starts the recovery of the following partial space. The following partial space can be recovered in advance, and therefore, in a case where the sequential access is continued after the use of all the translation information 1311 belonging to the partial space to which the translation information 1311 of the access target belongs, a response to the access request can be returned in a shorter time.

(Fifth Embodiment)

According to a fifth embodiment, the second recording unit 115 stores a memory image of the location information group 132 to a corresponding log area 203 in the unit of the partial space. More specifically, the second recording unit 115 divides the location information group 132 into each of the partial spaces, and each of the divided location information groups 132 are non-volatilized in the NAND memory 20. A memory image of the location information group 132 in the unit of the partial space will be denoted as a snapshot. The snapshot may be stored in an area other than the log areas 203. Here, it will be explained that the snapshot is stored in each of the log areas 203. The second recording unit 115 stores a snapshot of the same partial space to a corresponding log area 203 a plurality of times. For example, the second recording unit 115 counts the number of times the log 204 is stored for every partial space. When a count value of any given partial space reaches a certain value, the second recording unit 115 stores a snapshot of the any given partial space to the corresponding log area 203, and resets the count value. As described above, the second recording unit 115 stores the snapshot to the log area 203, so that the first recovery unit 116 can recover a location information group 132 of the partial space on the basis of only the snapshot and the log stored in the log area 203 after storing the snapshot.

Figure 12:
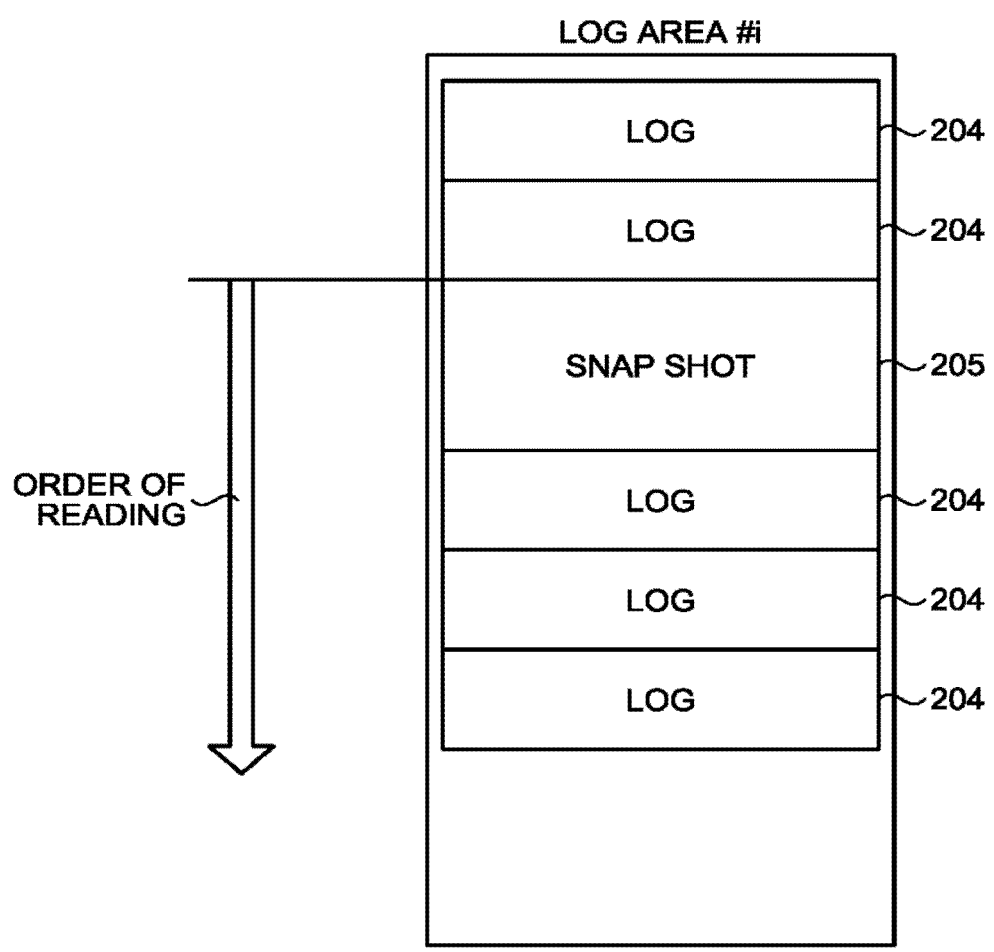
FIG. 12 is a figure for explaining a method of recovery of a partial space according to a fifth embodiment.

FIG. 12 is a figure for explaining a method of recovery of a partial space according to the fifth embodiment. First, the first recovery unit 116 reads a snapshot 205 from the log area 203, and stores the snapshot 205 to the location information group 132. In a case where the log area 203 stores a plurality of snapshots 205, the first recovery unit 116 reads one of the plurality of snapshots 205 that is lastly stored. Subsequently, the first recovery unit 116 reads, in the order in which the logs 204 are stored, all the logs 204 stored after the snapshot 205, stores the physical address recorded in each of the logs 204 in an overwriting manner to the location information group 132 for the logical address recorded in the log.

As described above, according to the fifth embodiment, the partial space can be recovered on the basis of only the snapshot 205 and the log area 204 stored to the log area 203 after the snapshot 205, and therefore, the amount of read from the log area 203 can be reduced. Accordingly, time for the booting is reduced. In a case where the first recovery unit 116 is configured to read, during the recovery, each of all the logs 204 stored in the log area 203 in the same order as the order in which the logs 204 are stored, the amount of the location information 1321 overwritten to the location information group 132 is reduced, thereby time for the booting is reduced.

(Sixth Embodiment)

Figure 13:
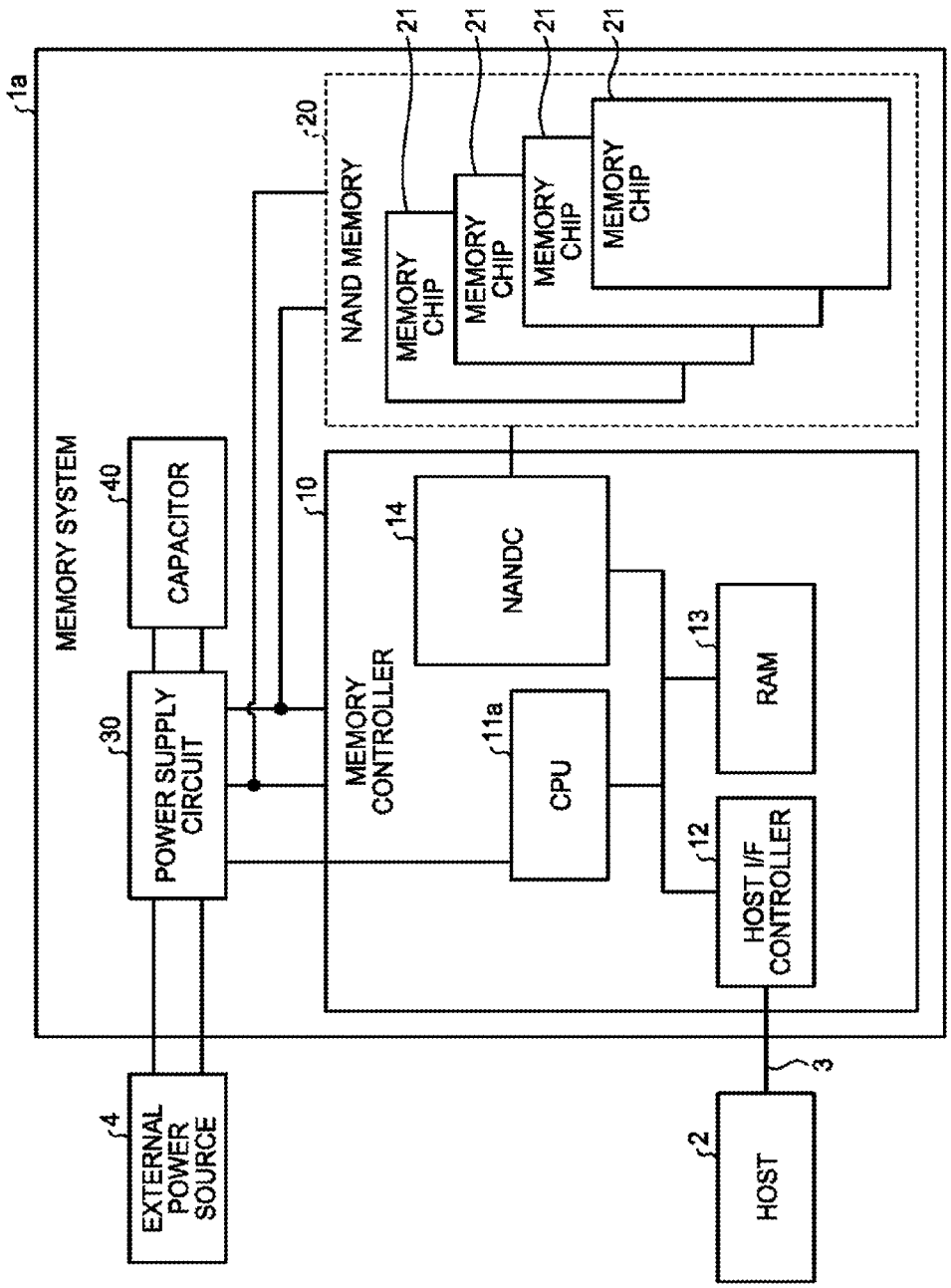
FIG. 13 is a figure illustrating an example of a configuration of a memory system according to a sixth embodiment.

FIG. 13 is a figure illustrating an example of a configuration of a memory system according to a sixth embodiment. The same constituent elements as those of the first embodiment will be denoted with the same names and reference numerals as those of the first embodiment, and repeating explanation thereabout will be omitted.

A memory system 1a is connected via a communication path 3 to a host 2. The memory system 1a includes a memory controller 10, a NAND memory 20, a power supply circuit 30, and a capacitor 40. The NAND memory 20 includes one or more memory chips 21.

The memory controller 10 includes a CPU 11a, a Host I/F controller 12, a RAM 13, and a NANDC 14. The CPU 11a, the Host I/F controller 12, the RAM 13, and the NANDC 14 are connected to each other via a bus.

Figure 14:
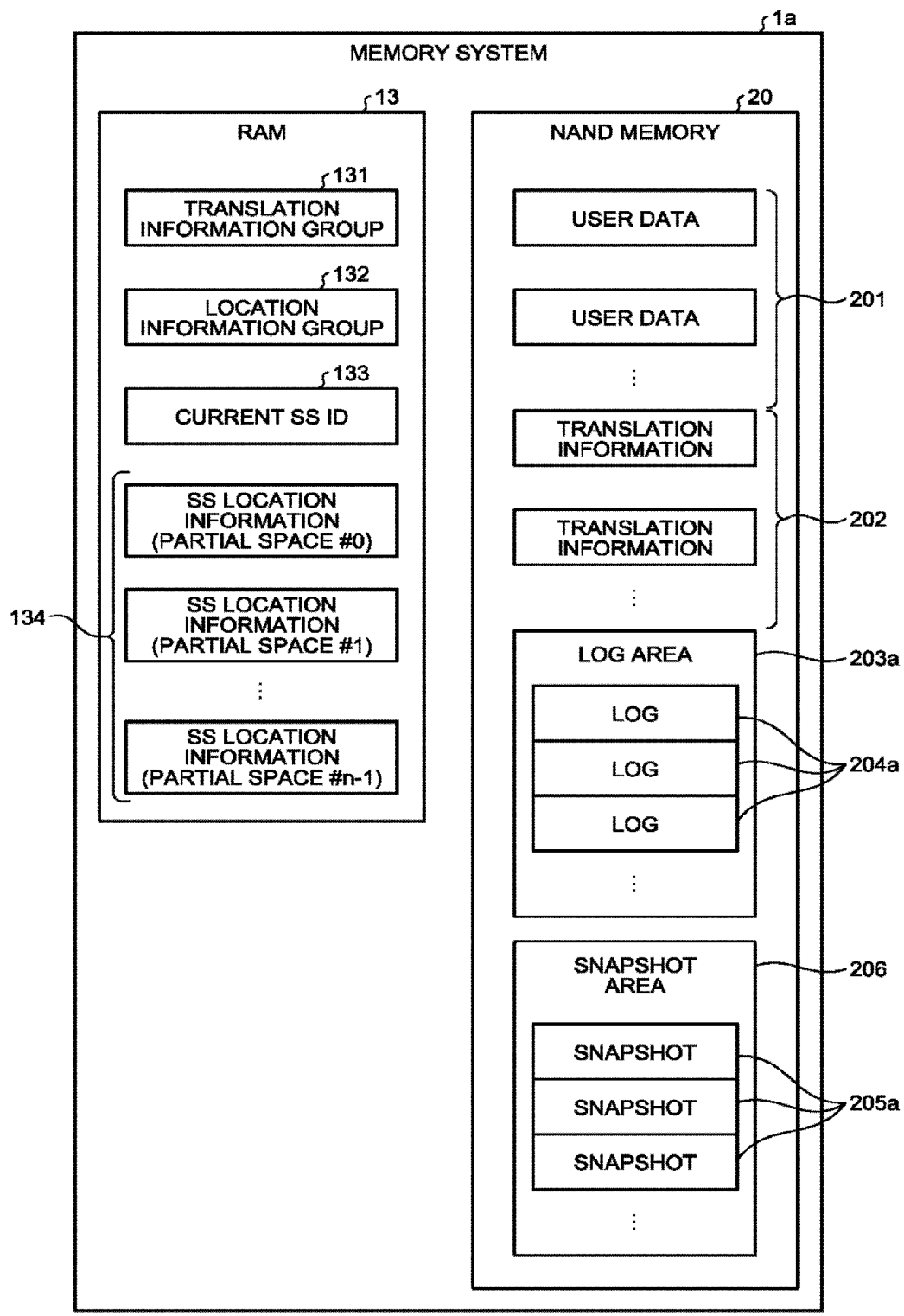
FIG. 14 is a figure illustrating an example of a configuration of a memory in the memory system according the sixth embodiment.

FIG. 14 is a figure illustrating an example of a configuration of a memory in the memory system 1a. The RAM 13 stores a translation information group 131 and a location information group 132. The NAND memory 20 stores one or more pieces of translation information 202 and one or more pieces of user data 201. Each piece of the user data 201 is data sent together with a write request from the host 2.

A log area 203a storing logs 204a and a snapshot (SS) area 206 storing snapshots (SSs) 205a are allocated in the NAND memory 20. The log area 203a is constituted by, for example, one or more blocks. The SS area 206 is constituted by, for example, one or more blocks. In the sixth embodiment, the log area 203a can store a log 204a of any partial space. The SS area 206 can store a snapshot 205a of any partial space.

The snapshot 205a is a memory image of the location information group 132 in the unit of the partial space. In other words, a snapshot 205a of a partial space #x is a copy of a group constituted by all the pieces of location information 1321 which belong to the partial space #x. Hereinafter the snapshot 205a of the partial space #x may be referred to as a snapshot #x.

A snapshot 205a of one partial space and a snapshot 205a of another partial space are not collectively saved in the SS area 206, and may be saved in the SS area 206 at different timings. In the present embodiment, "saving at different timings" means that non-volatilization of the translation information 1311, update of the location information group 132, generation of one or more logs 204a, or writing of one or more logs 204a can be done between the timing when a snapshot 205a of one partial space is saved in the SS area 206 and the timing when a snapshot 205a of another partial space is saved in the SS area 206.

Figure 15:
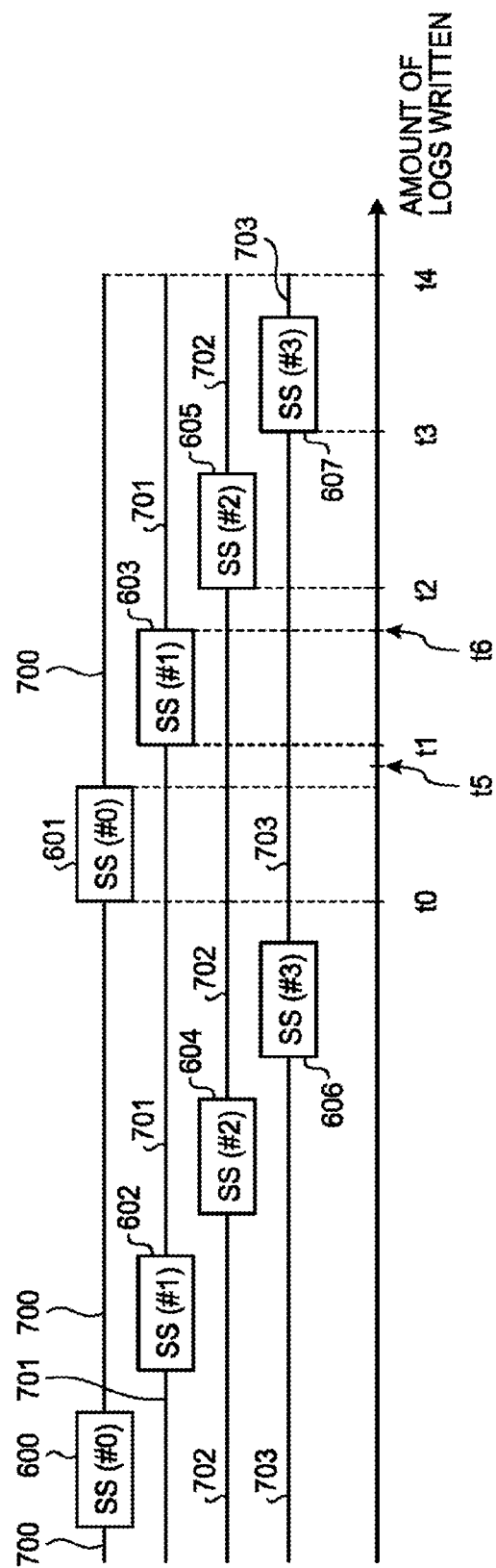
FIG. 15 is a figure for explaining an example of timing for saving a snapshot according to the sixth embodiment.

FIG. 15 is a figure for explaining an example of timing for saving the snapshot 205a. The horizontal axis is the amount of the logs 204a written. The amount of the logs 204a written is an integrated amount of logs 204a written in the log area 203a. In this example, it is assumed that the logical address space of the memory system 1a is divided into four partial spaces. More specifically, the memory image of the location information group 132 is divided into snapshot #0 to snapshot #3. A solid line in a horizontal direction indicates periods of time in which generation and writing of the logs 204a are performed. The period 700 is a period in which generation and writing of the log 204a of the partial space #0 are performed. The period 701 is a period in which generation and writing of the log 204a of the partial space #1 are performed. The period 702 is a period in which generation and writing of the log 204a of the partial space #2 are performed. The period 703 is a period in which generation and writing of the log 204a of the partial space #3 are performed. The timing 600 and the timing 601 are timings when the snapshot #0 is saved. The timing 602 and the timing 603 are timings when the snapshot #1 is saved. The timing 604 and the timing 605 are timings when the snapshot #2 is saved. The timing 606 and the timing 607 are timings when the snapshot #3 is saved. As described above, the snapshot #0 to the snapshot #3 are saved in the SS area 206 at different timings. More specifically, as shown by the timing 600, the timing 602, the timing 604, and the timing 606 (the timing 601, the timing 603, the timing 605, and the timing 607 in another example), the snapshots 205a are written in the SS area 206 in the following sequence: the partial space #0, the partial space #1, the partial space #2, and then the partial space #3. As indicated by the timing 606 and the timing 607, after the snapshot 205a of the partial space #3, the snapshot 205a of the partial space #0 is saved in the SS area 206. When a predetermined amount of logs 204a are written in the log area 203a after a snapshot 205a of a single partial space is saved in the SS area 206, a snapshot 205a for a subsequent partial space is saved in the SS area 206. Writing of a log 204a is executed from when a snapshot 205a for one partial space is saved to when a snapshot 205a for another partial space is saved.

The amount of the logs 204a written in the log area 203a monotonically increases with time. At a timing when a predetermined period passes since a snapshot 205a for one partial space is saved in the SS area 206, a snapshot 205a for another partial space may be saved in the SS area 206.

At a timing when a predetermined amount of logs 204a are generated after a snapshot 205a for one partial space is saved in the SS area 206, a snapshot 205a for a subsequent partial space may be saved in the SS area 206.

The log 204a which belongs to the partial space #x is generated in response to non-volatilization of the translation information 1311 which belongs to the partial space #x. At a timing when a predetermined amount of translation information 1311 is non-volatilized after a snapshot 205a of one partial space is saved in the SS area 206, a snapshot 205a of a subsequent partial space may be saved in the SS area 206.

The non-volatilization of the translation information 1311 is executed in response to update of the translation information 1311. At a timing when a predetermined amount of translation information 1311 is updated after a snapshot 205a of one partial space is saved in the SS area 206, a snapshot 205a of a subsequent partial space may be saved in the SS area 206.

Since the snapshot #x and the snapshot #y are saved in the SS area 206 at different timings, the time it takes to perform processing for recovering the location information group 132 onto the RAM 13 can be reduced as compared with the case where the memory images of the location information group 132 are collectively saved in the SS area 206 at a time (which will be hereinafter referred to as comparative example). Since the snapshot #x and the snapshot #y are saved in the SS area 206 at different timings, a degradation in a response caused by processing for saving the memory images of the location information group 132 can be suppressed.

For example, a case where a power supply interruption occurs at a time t4 in FIG. 15 will be considered. The time of timing 601 will be denoted as t0, the time of timing 603 will be denoted as t1, the time of timing 605 will be denoted as t2, the time of timing 607 will be denoted as t3. The time t4 is timing between the timing 607 and timing when a subsequent snapshot #0 is saved. In this case, the logs 204a which belong to the partial space #0 and which are generated after the timing 601, i.e., timing when the snapshot #0 is saved most recently, are required for the recovery of the location information group 132. It should be noted that "a log 204a is generated after timing 60x" means, more precisely, that the update indicted by the log 204a of the location information group 132 is performed after the timing 60x. The logs 204a which belong to the partial space #1 and which are generated after the timing 603, i.e., timing when the snapshot #1 is saved most recently, are required for the recovery of the location information group 132. The logs 204a which belong to the partial space #2 and which are generated after the timing 605, i.e., timing when the snapshot #2 is saved most recently, are required for the recovery of the location information group 132. The logs 204a which belong to the partial space #3 and which are generated after the timing 607, i.e., timing when the snapshot #3 is saved most recently, are required for the recovery of the location information group 132.

In another example, a case where a power supply interruption occurs at a time t5 in FIG. 15 will be considered. The time t5 is a time between the timing 601 and the time t1. In this case, the logs 204a which belong to the partial space #0 and which are generated after the timing 601, i.e., timing when the snapshot #0 is saved most recently, are required for the recovery of the location information group 132. The logs 204a which belong to the partial space #1 and which are generated after the timing 602, i.e., timing when the snapshot #1 is saved most recently, are required for the recovery of the location information group 132. The logs 204a which belong to the partial space #2 and which are generated after the timing 604, i.e., timing when the snapshot #2 is saved most recently, are required for the recovery of the location information group 132. The logs 204a which belong to the partial space #3 and which are generated after the timing 606, i.e., timing when the snapshot #3 is saved most recently, are required for the recovery of the location information group 132.

In another example, a case where a power supply interruption occurs at a time t6 in FIG. 15 will be considered. The time t6 is a time between the timing 603 and the time t2. In this case, the logs 204a which belong to the partial space #0 and which are generated after the timing 601, i.e., timing when the snapshot #0 is saved most recently, are required for the recovery of the location information group 132. The logs 204a which belong to the partial space #1 and which are generated after the timing 603, i.e., timing when the snapshot #1 is saved most recently, are required for the recovery of the location information group 132. The logs 204a which belong to the partial space #2 and which are generated after the timing 604, i.e., timing when the snapshot #2 is saved most recently, are required for the recovery of the location information group 132. The logs 204a which belong to the partial space #3 and which are generated after the timing 606, i.e., timing when the snapshot #3 is saved most recently, are required for the recovery of the location information group 132.

As described above, a snapshot #i which is saved most recently from among one or more snapshots #i which belong to the partial space #i is used for the recovery of the location information group 132. The logs 204a which belong to the partial space #i and which are generated after the snapshot #i that has been saved most recently are required for the recovery of the location information group 132.

In contrast, according to the comparative example, the snapshot #0 to the snapshot #3 are collectively saved in the SS area 206 at the timing t0. For example, the snapshot #0 to the snapshot #3 are collectively saved at the time t0, and a power supply interruption occurs at the time t4, logs 204a which belong to each partial space and which are generated after the time t0 are required for the recovery of the location information group 132. In this case, more logs 204a are required for the recovery as compared with the present embodiment. More specifically, in the comparative example, more logs 204a may be required for the recovery of the location information group 132 as compared with this sixth embodiment. According to the sixth embodiment, by reducing the number of logs 204a required for recovery of the location information group 132, the time it takes to perform the processing for recovering the location information group 132 on the RAM 13 can be reduced. In the sixth embodiment, it is assumed that all the location information group is recovered at the booting.

According to the comparative example, upon operation for saving the snapshot #0 to the snapshot #3, a memory system cannot respond to a request from the host 2. Therefore, until the operation for saving the snapshot #0 to the snapshot #3 is completed, a response to the request can be delayed. In contrast, according to the sixth embodiment, the memory system 1a can process the request and respond thereto after the operation for saving a single snapshot 205a is completed. The time it takes to perform the operation for saving all of the snapshot #0 to the snapshot #3 is longer than the time it takes to perform operation for saving some of the snapshot #0 to the snapshot #3. Therefore, according to the sixth embodiment, a delay in a response caused by the processing for saving the memory images of the location information group 132 can be suppressed.

Each snapshot 205a and each log 204a are associated with an ID (SS ID) for determining timing. The method for associating an SS ID is not limited to any particular method as long as it is a method capable of identifying each snapshot 205a and each log 204a. As an example of an aspect of associating an SS ID, in this case, an SS ID is recorded in each snapshot 205a and each log 204a. Any given information may be employed as an SS ID as long as it is information capable of identifying the sequence in which the snapshots 205a are saved. For example, the time when the snapshot 205a is saved may be employed as an SS ID. In this case, for example, a sequence number that is increased by one every time a single snapshot 205a is saved in the SS area 206 is employed as an SS ID. When a log 204a is generated in the log area 203a, an SS ID given to a snapshot 205a immediately before is given to the log 204a. The SS ID associated with the log 204a is not changed until the log 204a is erased.

Figure 16:
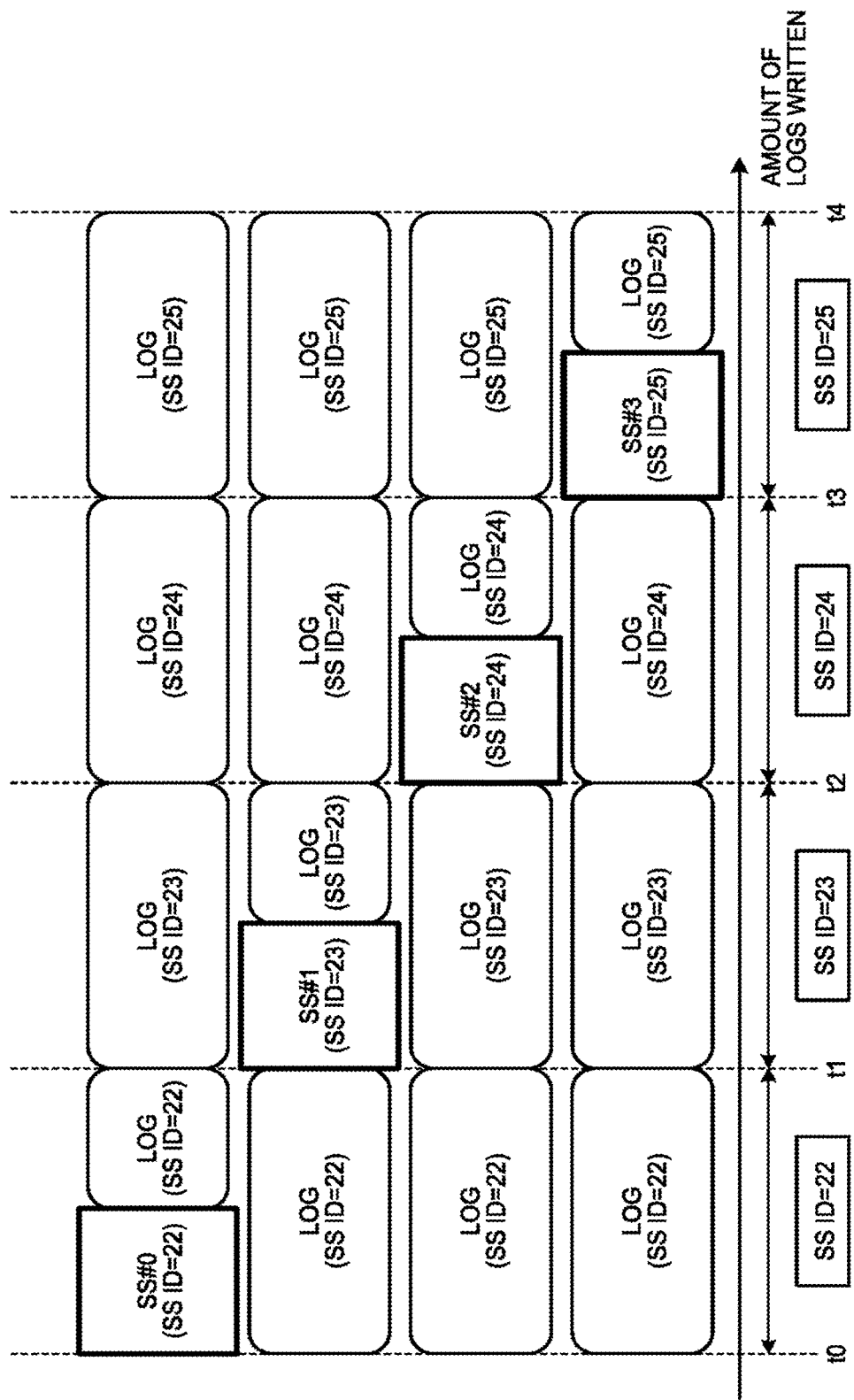
FIG. 16 is a figure illustrating an example of associating SS ID according to the sixth embodiment.

FIG. 16 is a figure illustrating an example of association of SS IDs. FIG. 16 corresponds to the example of FIG. 15. An SS ID "22" is given to the snapshot #0 saved at the timing 601, an SS ID "23" is given to the snapshot #1 saved at the timing 603, SS ID "24" is given to the snapshot #2 saved at the timing 605, and SS ID "25 " is given to the snapshot #3 saved at the timing 607. The SS ID "22" is given to all the logs 204a generated between the time t0 at the start of the timing 601 and the time t1 at the start of the timing 603. The SS ID "23" is given to all the logs 204a generated between the time t1 and the time t2 at the start of the timing 605. The SS ID "24" is given to all the logs 204a generated between the time t2 and the time t3 at the start of the timing 607. The SS ID "25" is given to all the logs 204a generated between the time t3 and the time t4 at the start of the timing 607. The SS ID "26" is given to all the logs 204a after the time t4 but before the snapshot #0 is subsequently saved. As described above, when the log 204a is generated, the same SS ID as the SS ID given to the snapshot 205a that has been saved most recently in the timing in which the log 204a is written is given to the log 204a.

Back to FIG. 14, an SS ID current value 133 and one or more pieces of SS location information 134 are further stored to the RAM 13.

The current SS ID 133 is increased by one when the snapshot 205a is started to be saved, and the increased current SS ID 133 is given to the snapshot 205a as an SS ID.

When the log 204a is generated, the current SS ID 133 is given to the log 204a as an SS ID.

A single piece of SS location information 134 is stored in the RAM 13 for each partial space. In this case, like the first embodiment, the logical address space of the memory system 1a is considered to be divided into n partial spaces (partial space #0 to partial space #n−1). More specifically, n pieces of SS location information 134 are stored in the RAM 13. Each piece of the SS location information 134 is information about the location of a snapshot 205a which is one of one or more snapshots 205a about the corresponding partial space and which is stored in the SS area 206 most recently. The physical address, the offset from the head location of the SS area 206, the sequence of writing, and the like may be used as the SS location information 134.

It should be noted that the SS ID current value 133 and the SS location information 134 for each partial space are caused to be saved to the NAND memory 20 upon power supply interruption by, for example, the address control unit 112a explained later. The current SS ID 133 and the SS location information 134 for each partial space are loaded from the NAND memory 20 to the RAM 13 upon booting by, for example, the address control unit 112a.

Figure 17:
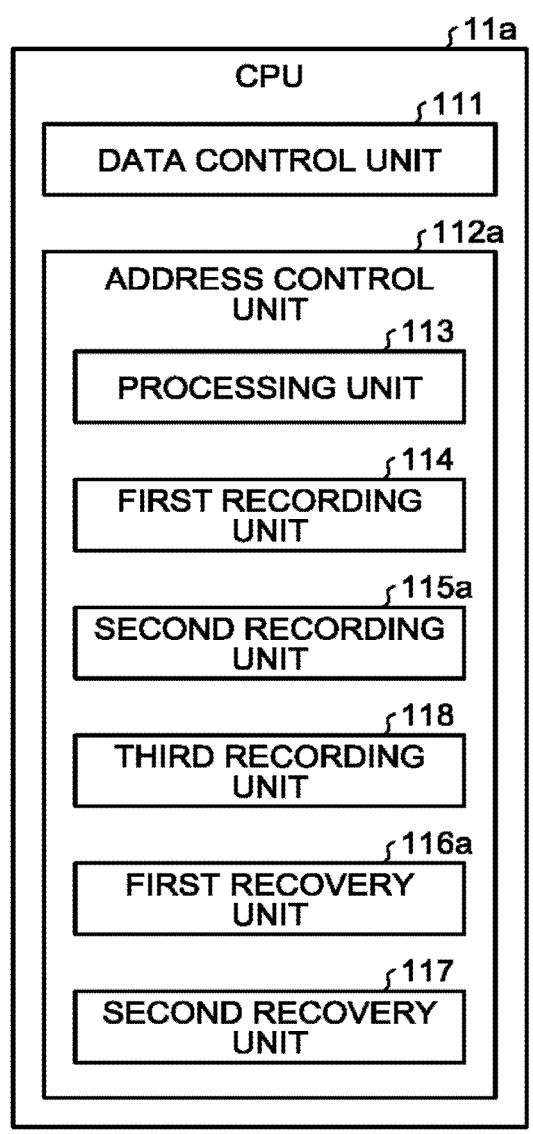
FIG. 17 is a figure illustrating a functional configuration achieved by a CPU on the basis of a firmware according to the sixth embodiment.

FIG. 17 is a figure illustrating a functional configuration according to the sixth embodiment realized on the basis of a firmware with the CPU 11a. The CPU 11a includes a data control unit 111 and an address control unit 112a. The address control unit 112a includes a processing unit 113, a first recording unit 114, a second recording unit 115a, a third recording unit 118, a first recovery unit 116a, and a second recovery unit 117.

The processing unit 113 executes the processing for translating a logical address into a physical address. The first recording unit 114 executes update of the translation information group 131 and non-volatilization of each piece of the translation information 1311. The second recording unit 115a executes writing of each log 204a and update of the location information group 132. The third recording unit 118 executes saving of each snapshot 205a. The first recovery unit 116a executes recovery of the location information group 132. The second recovery unit 117 executes recovery of the translation information group 131.

Figure 18:
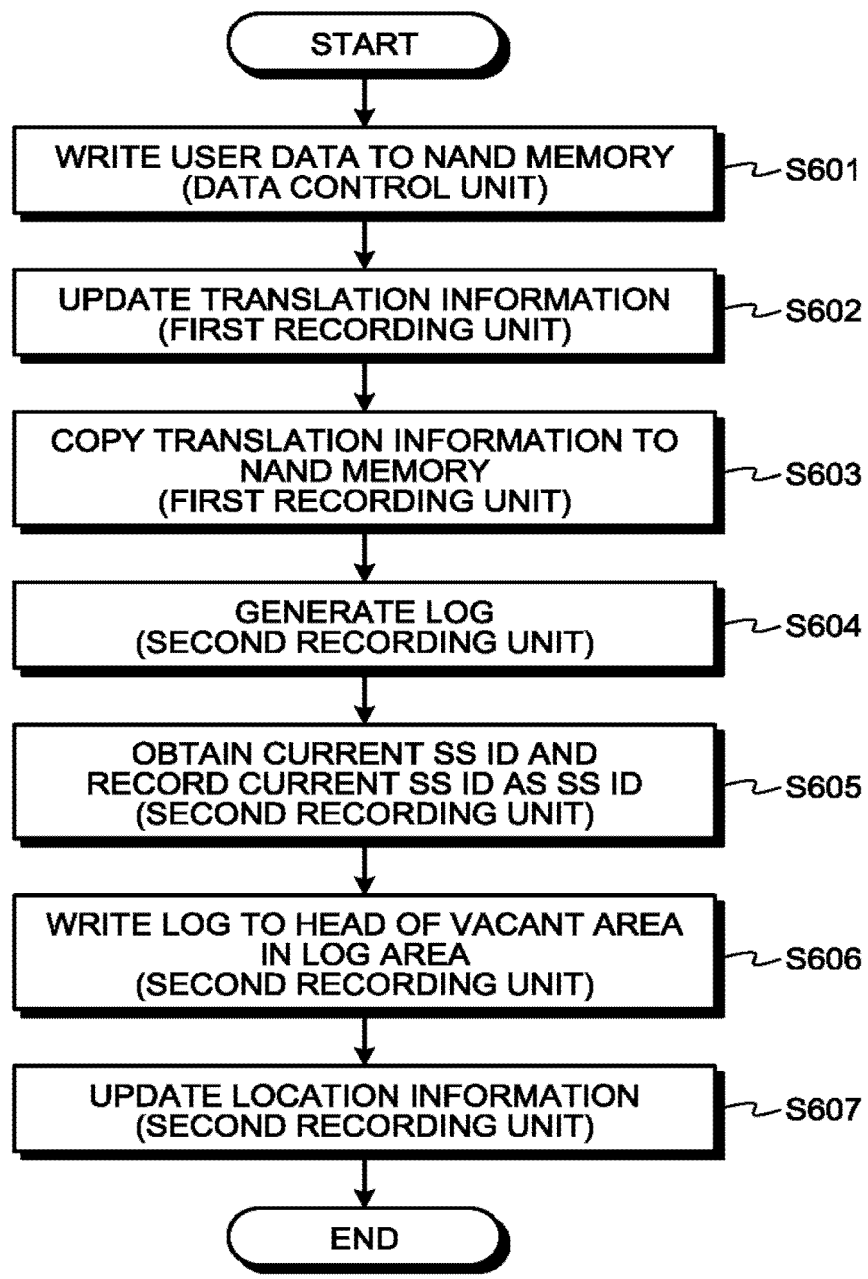
FIG. 18 is a flowchart for explaining operation of non-volatilization according to the sixth embodiment.

FIG. 18 is a flowchart for explaining operation of non-volatilization according to the sixth embodiment. When the data control unit 111 writes, to the NAND memory 20, the user data 201 received from the host 2 with the designation of the logical address (S601), the first recording unit 114 updates the translation information 1311 (S602). For example, in a case where the logical address "La" is designated, and the write destination physical address obtained from the processing of S601 is "Pa", the first recording unit 114 writes the physical address "Pa" to the translation information 1311 about the logical address "La" in an overwriting manner.

When it is timing of non-volatilization, the first recording unit 114 non-volatilizes, in the NAND memory 20, the translation information 1311 updated in the processing of S602 (S603). Then, the second recording unit 115a generates a log 204a (S604). For example, in a case where the translation information 1311 about the logical address "La" is written in the location indicated by the physical address "Pb" by the processing in S603, the second recording unit 115a generates a log 204a for associating the logical address "La" and the physical address "Pb" in the processing of S604.

Subsequently, the second recording unit 115a obtains the current SS ID 133, and records the current SS ID 133 as an SS ID in the log 204a (S605). The second recording unit 115a stores the log 204a at the head of the vacant area in the log area 203a (S606). Then, the second recording unit 115a updates the corresponding location information 1321 (S607). For example, the second recording unit 115a writes the physical address "Pb" to the location information 1321 about the logical address "La" in an overwriting manner.

In the explanation about this case, after the log 204a is stored, the location information 1321 is updated. Alternatively, before or after the generation of the log 204a or before the log 204a is stored, the location information 1321 may be updated. After a predetermined number of pieces of translation information 1311 have been non-volatilized, the second recording unit 115a may collectively store a predetermined number of logs 204a corresponding to the predetermined number of pieces of translation information 1311.

Figure 19:
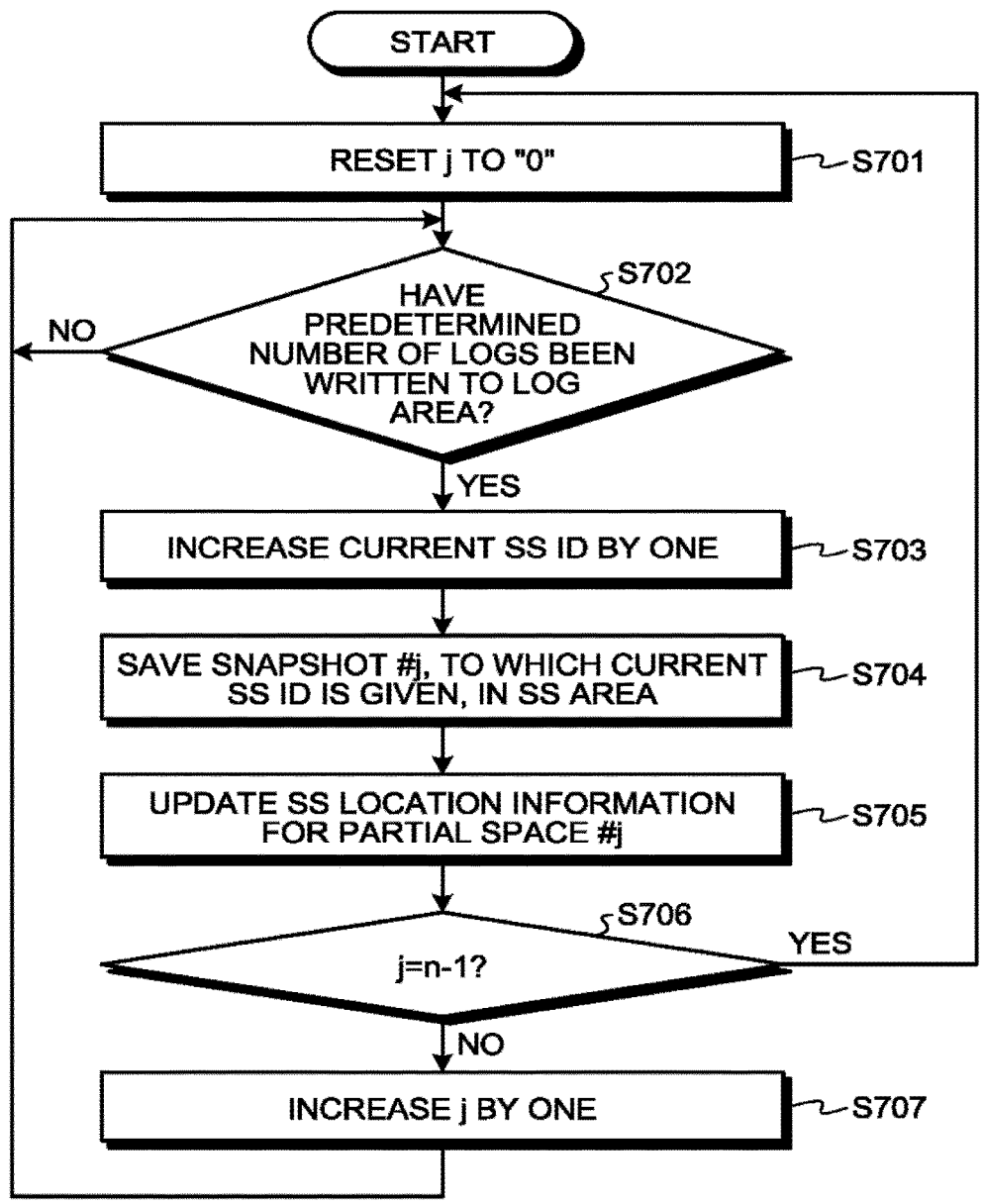
FIG. 19 is a flowchart for explaining operation of saving a snapshot according to the sixth embodiment.

FIG. 19 is a flowchart for explaining operation for saving the snapshot 205a. First, the third recording unit 118 sets j to "0" (S701). In FIG. 19, j is a variable used in the subsequent processing. Then, the third recording unit 118 determines whether a predetermined number of logs 204a have been written in the log area 203a or not (S702). In a case where a snapshot 205a has been stored in the processing of S704 explained later, the third recording unit 118 determines whether the predetermined number of logs 204a have been newly written, after the snapshot 205a has been most recently stored in the processing of S702, in the log area 203a or not. In a case where the predetermined number of logs 204a are determined not to have been written in the log area 203a (S702, No), the third recording unit 118 executes the processing of S702 again.

In a case where the predetermined number of logs 204a are determined to have been written in the log area 203a (S702, Yes), the third recording unit 118 increases the SS ID current value 133 by one (S703). Then, the third recording unit 118 attaches the increased SS ID current value 133, as an SS ID, to all the pieces of location information 1321 related to the partial space #j, and stores them as a snapshot #j to the head of the vacant area of the SS area 206 (S704). The third recording unit 118 updates the SS location information 134 related to the partial space #j with the location where the snapshot #j has been saved in the processing of S704 (S705).

Subsequently, the third recording unit 118 determines whether j is equal to n−1 or not (S706). Here, n is a number of partial spaces. In a case where j is not equal to n−1 (S706, No), the third recording unit 118 increases j by one (S707), and executes the processing of S702 again. In a case where j is equal to n−1 (S706, Yes), the third recording unit 118 executes the processing of S701 again.

It should be noted that j in FIG. 19 may be saved in the NAND memory 20 upon power supply interruption by, for example, the third recording unit 118, and may be loaded from the NAND memory 20 upon booting, and may be started from the processing of S702 after the booting. The third recording unit 118 may start operation from S701 on each boot.

Figure 20:
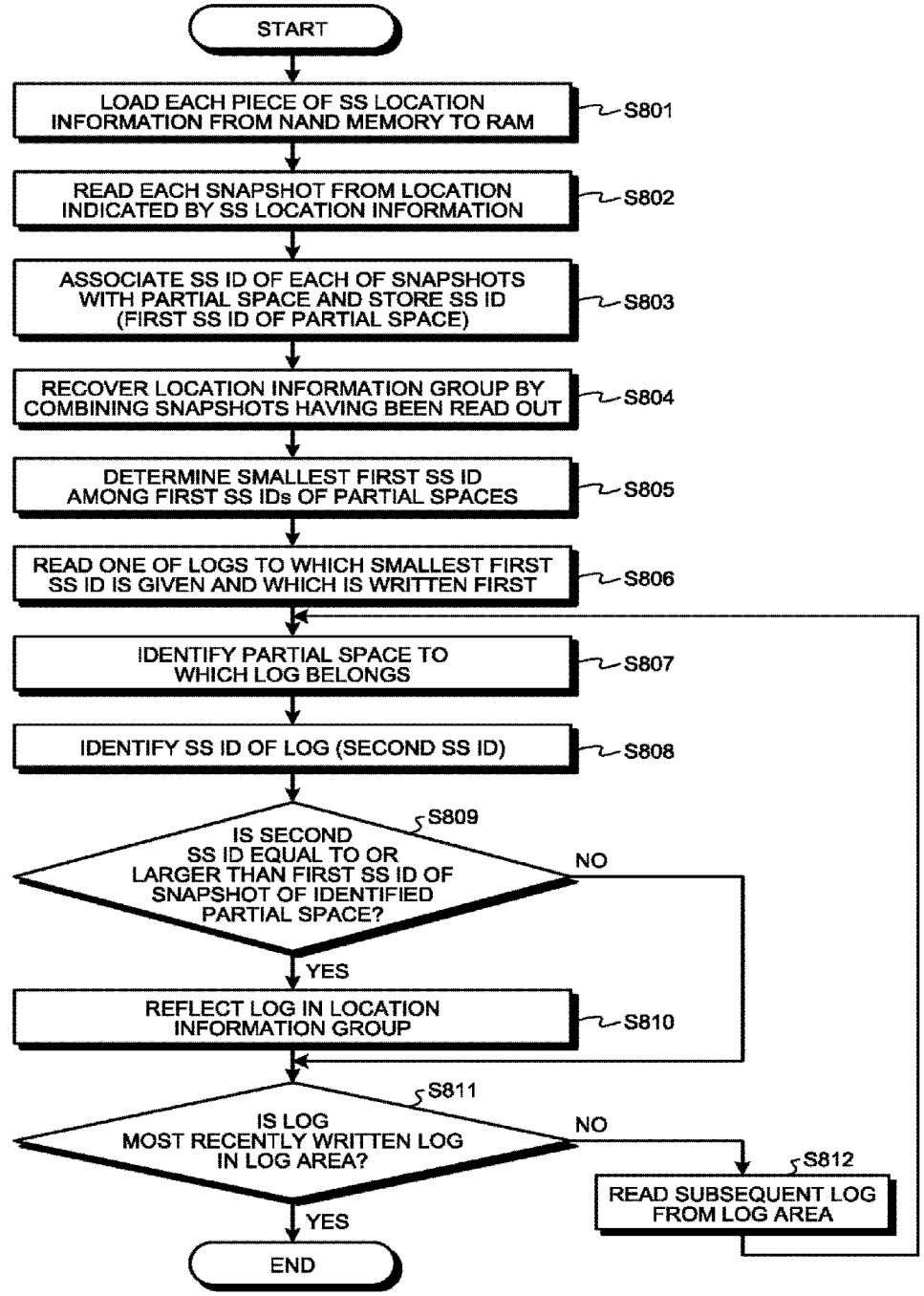
FIG. 20 is a flowchart for explaining operation of recovery of a location information group according to the sixth embodiment.

FIG. 20 is a flowchart for explaining operation of recovery of the location information group 132 according to the sixth embodiment. First, the first recovery unit 116a loads each pieces of SS location information 134 from the NAND memory 20 to the RAM 13 (S801). Then, the first recovery unit 116a reads each snapshot 205a stored at the location indicated by each piece of the SS location information 134 (S802). The first recovery unit 116a stores the SS IDs written in each of the snapshots 205a (hereinafter referred to as a first SS ID of the partial space) upon associating the SS ID with the partial space (S803). In the processing of S803, for example, the first recovery unit 116a stores the first SS IDs of the partial spaces to a temporary storage area (not shown) in the RAM 13. After the processing of S803, the first recovery unit 116a recovers the location information group 132 by combining each of the snapshots 205a on the RAM 13 (S804). More specifically, in the processing of S802 to S804, the first recovery unit 116a loads the location information group 132 to the RAM 13. However, the location information group 132 recovered in the processing of S804 is in a state before each log 204a is reflected, and is therefore, in the state different from the state immediately before the power supply interruption.

Subsequently, the first recovery unit 116a determines the smallest (oldest) first SS ID among the first SS IDs of the partial spaces (S805). Then, the first recovery unit 116a reads, from the log area 203a, the log 204a which has been first written in the log area 203a among the logs 204a to which the smallest (oldest) first SS ID is attached (S806). The first recovery unit 116a temporarily stores the log 204a, for example, in a buffer area (not shown) on the RAM 13. When the RAM 13 has an SRAM, the SRAM may be provided with the buffer area.

Any method may be employed as the method for identifying the log 204a which has been first written in the log area 203a among the logs 204a to which the smallest (oldest) first SS ID is attached. For example, the third recording unit 118 writes the location of the log 204a, which has been written immediately before, to each snapshot 205a. The first recovery unit 116a can identify the log 204a which has been first written in the log area 203a among the logs 204a to which the obtained smallest first SS ID is attached, on the basis of the location written in the snapshot 205a to which the obtained smallest first SS ID is attached.

Subsequently, the first recovery unit 116a identifies the partial space to which the log 204a belongs (S807). The first recovery unit 116a can identify the partial space on the basis of the logical address written in the log 204a. The first recovery unit 116a obtains the SS ID of the log 204a (second SS ID) (S808).

Subsequently, the first recovery unit 116a determines whether the second SS ID is equal to or larger than the first SS ID of the snapshot 205a of the partial space identified from among multiple first SS IDs (S809). The processing of S809 is processing for determining whether the log 204a is generated after the snapshot 205a with regard to the same partial space. "When the second SS ID is equal to or larger than the first SS ID with regard to the same partial space" means that the log 204a is a log 204a generated after the snapshot 205a is stored in the SS area 206, and is a log 204a required for recovery. "When the second SS ID is smaller than the first SS ID with regard to the same partial space" means that the log 204a is a log 204a generated before the snapshot 205a is stored in the SS area 206, and is a log 204a that is not required for recovery. When the second SS ID is equal to or larger than the first SS ID of the snapshot 205a of the partial space identified (S809, Yes), the first recovery unit 116a reflects the log 204a in the location information group 132 (SS10). To reflect means to write, in an overwriting manner, the physical address written in the log 204a into the location corresponding to the logical address written in the log 204a in the location information group 132. In a case where the second SS ID is smaller than the first SS ID of the snapshot 205a of the partial space identified (S809, No), the first recovery unit 116a skips the processing of S810.

Subsequently, the first recovery unit 116a determines whether the log 204a is a log 204a that has been written most recently in the log area 203a (S811). In a case where the log 204a is determined not to be the log 204a that has been written most recently in the log area 203a (S811, No), the first recovery unit 116a reads a subsequent log 204a from the log area 203 (S812), and executes the processing of S807 again. In a case where the log 204a is determined to be a log 204a that has been written most recently in the log area 203a (S811, Yes), the first recovery unit 116a terminates the operation. Whether or not the log 204a is the log 204a that has been written most recently in the log area 203a can be determined by any given method. For example, the second recording unit 115a tracks the location of the log 204a stored most recently in the log area 203a by using the physical address, the offset from the head location of the log area 203a, the sequence of writing, and the like. The first recovery unit 116a inquires of the second recording unit 115a about the log 204a written most recently in the log area 203a.

As described above, according to the sixth embodiment, the third recording unit 118 saves snapshots 205a for at least two different partial spaces at different timings. According to this configuration, it takes a shorter time to recover the location information group 132 upon booting. In addition, a delay in a response due to the processing for saving the snapshot 205a can be suppressed.

The first recording unit 114 writes the translation information 1311 to the NAND memory 20. The second recording unit 115a updates a corresponding location information 1321 in the location information group 132 when the first recording unit 114 writes the translation information 1311 in the NAND memory 20. The second recording unit 115a generates a log 204a and writes the generated log 204a in the log area 203a when the first recording unit 114 writes the translation information 1311 in the NAND memory 20.

Upon booting, the first recovery unit 116b loads each snapshot 205a to the RAM 13, and recovers a portion of the location information group 132. Then, the first recovery unit 116b applies each of the valid logs 204a to the location information group 132 recovered in the RAM 13 with each snapshot 205a. More specifically, the first recovery unit 116b selects a log 204a which belongs to a partial space #i and which is generated when the location information group 132 is updated after the timing of saving a snapshot #i, and reflects the selected log 204a in the location information group 132. The first recovery unit 116b does not reflect a log 204a that has not been selected. More specifically, only the log 204a which is related to the same partial space and which is generated when the location information group 132 is updated after the snapshot #i is used for recovery of the location information group 132, and therefore, the number of logs 204a used for the recovery is suppressed.

The first recovery unit 116a uses, with regard to each partial space, the snapshot 205a saved most recently for the recovery of the location information group 132. Therefore, the number of logs 204a used for the recovery can be suppressed.

In this explanation, with regard to each partial space, the snapshot 205a that has been saved most recently is used for the recovery. Alternatively, a snapshot 205a other than the snapshot 205a that has been saved most recently may also be used for the recovery. In a case where the snapshot 205a other than the snapshot 205a that has been saved most recently is used for the recovery, the log 204a which is generated when the location information group 132 is updated after the timing for saving the snapshot 205a used for the recovery is used for the recovery.

(Seventh Embodiment)

In a sixth embodiment, a log 204a which belongs to any given partial space is written in the log area 203a. In contrast, in the seventh embodiment, a log 204a of each partial space is written in a different area allocated individually for each partial space.

Figure 21:
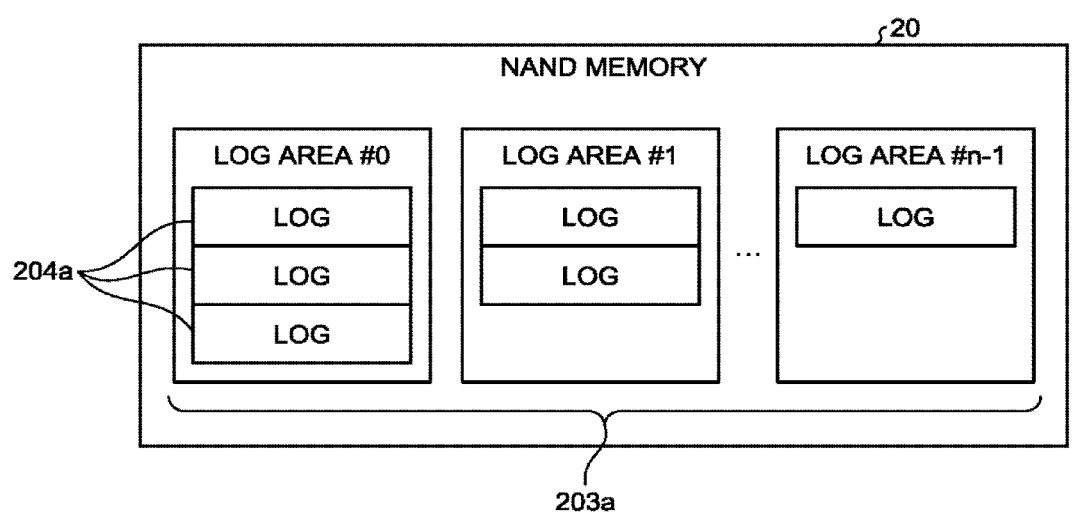
FIG. 21 is a figure illustrating a log area according to a seventh embodiment.

FIG. 21 is a figure illustrating the log area 203a according to the seventh embodiment. According to the seventh embodiment, the log area 203a is allocated separately for each partial space in the NAND memory 20 like the first embodiment. Each of n log areas 203a is distinguished by using a number (#0 to #n−1). Each of the log areas 203a is constituted by, for example, one or more blocks. The second recording unit 115a writes the log 204a which belongs to a partial space #i to a head of a vacant area of the log area #i.

Subsequently, operation of recovery of the location information group 132 according to the seventh embodiment will be explained. In this case, for example, location information 1321 which belongs to a particular partial space is selectively recovered. Any scheme may be employed as the scheme for selecting a partial space which is to be recovered. For example, like the on-demand recovery, in response to, as a trigger, the attempt to use the translation information 1311 which belongs to the unrecovered partial space, the unrecovered partial space is set as a recovery target. In another example, a partial space following the access destination partial space is set as the recovery target. In still another example, a partial space of the recovery target is designated with the host 2.

Figure 22:
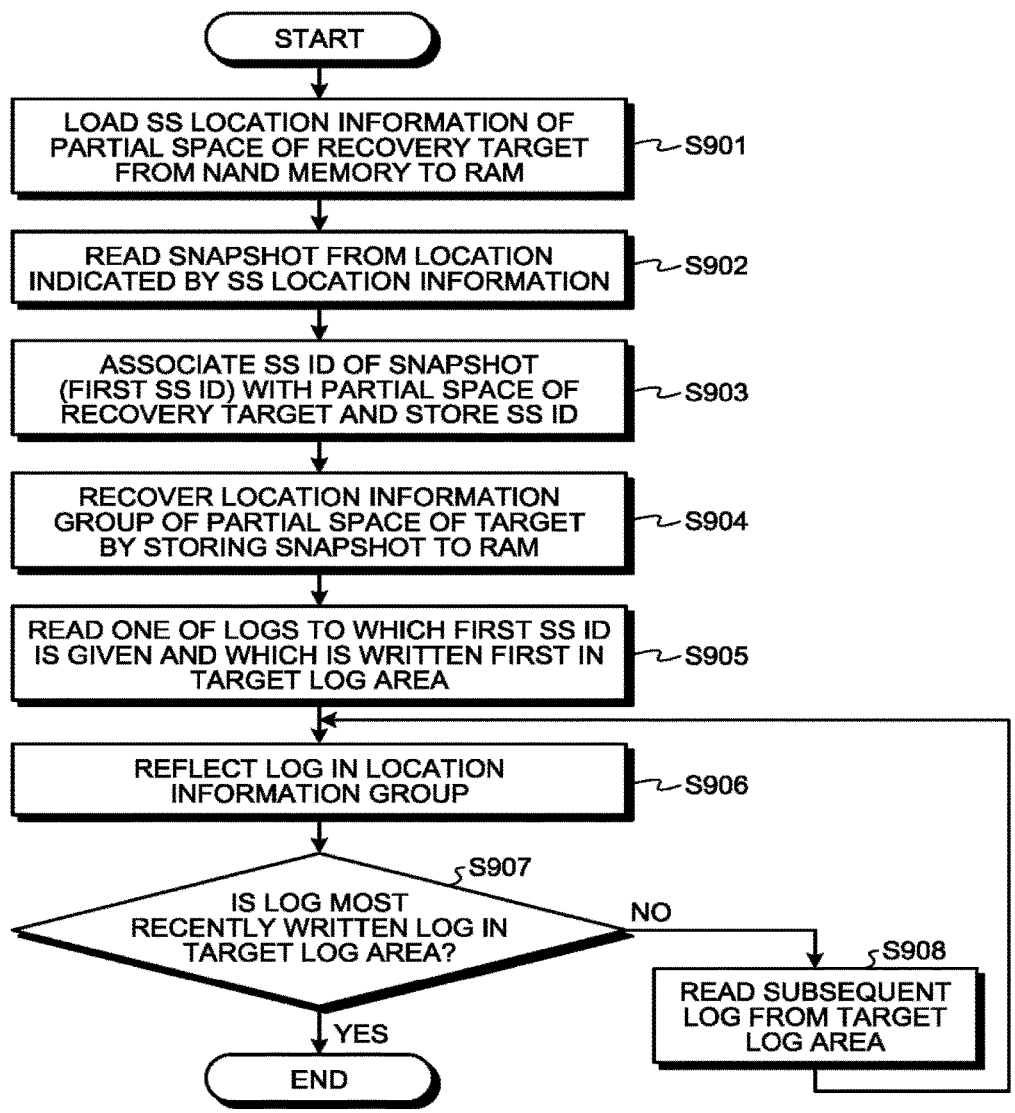
FIG. 22 is a flowchart for explaining operation of recovery of a location information group according to the seventh embodiment.

FIG. 22 is a flowchart for explaining operation of recovery of the location information group 132 according to the seventh embodiment. First, the first recovery unit 116a loads the SS location information 134 of the partial space of the recovery target from the NAND memory 20 to the RAM 13 (S901). Then, the first recovery unit 116a reads a snapshot 205a from a location indicated by the SS location information 134 (S902). The first recovery unit 116a associates a SS ID written in the snapshot 205a (first SS ID of the partial space) with the partial space of the recovery target and stores the SS ID (S903). Then, the first recovery unit 116a recovers the location information group 132 related to the partial space of the recovery target by storing each of the snapshots 205a in the RAM 13 (S904). However, the location information group 132 recovered in the processing of S904 is in a state before each log 204a is reflected. Therefore, the location information group 132 is in a state different from the state immediately before the power supply interruption.

Subsequently, the first recovery unit 116a reads, among the logs 204a to which the first SS ID is attached, a log 204a which had been first written in the log area 203a corresponding to the partial space of the recovery target from the log area 203a (S905). It should be noted that the log area 203a corresponding to the partial space of the recovery target will be denoted as a target log area 203a. The first recovery unit 116a reflects the log 204a in the location information group 132 (S906).

The first recovery unit 116a determines whether the log 204a is the log 204a that had been written most recently in the target log area 203a (S907). In a case where the log 204a is determined not to be the log 204a that had been written most recently in the target log area 203a (S907, No), the first recovery unit 116a reads the log 204a written in the log area 203a of the subsequent target (S908), and executes the processing of S906 again.

In a case where the log 204a is determined to be the log 204a that had been written most recently in the target log area 203a (S907, Yes), the first recovery unit 116a terminates the operation.

As described above, according to the seventh embodiment, each log 204a is written in a different area for each partial space, and the first recovery unit 116a selectively recovers the location information group 132 of the partial space of the recovery target. After the location information group 132 of the partial space of the recovery target is recovered, the second recovery unit 117 can execute recovery of the translation information group 131 of the partial space of the recovery target on the basis of the location information group 132 of the partial space of the recovery target which has been recovered. Therefore, according to the seventh embodiment, a response to an access request can be returned in a shorter time as compared with the case where the location information group 132 of all the partial spaces are collectively regarded as the recovery target.

In the explanation about this case, a particular partial space is configured to be a recovery target, and the memory system 1a may be configured so that all the partial spaces are collectively set as the recovery target. In this case, the first recovery unit 116a executes the processing of FIG. 22 for all the partial spaces.

(Eighth Embodiment)

The translation information group 131 may be non-volatilized by the unit larger than the translation information 1311. In an eighth embodiment, a technique for non-volatilizing translation information group 131 by the unit larger than the translation information 1311 will be explained. It should be noted that the eighth embodiment can also be applied to the first to seventh embodiments.

For example, the logical address spaces of the memory systems 1, 1a include multiple regions. The region is a space smaller than the partial space and larger than the space to which one single physical address is allocated by the translation information 1311 on the logical address space. Each of the regions may be identified by more significant bits of the logical address. In this case, the more significant bits of the logical address will be denoted as a region address for identifying each region.

The first recording unit 114 non-volatilizes the translation information group 131 in the unit of the region. Non-volatilizing the translation information group 131 in the unit of the region is collectively non-volatilizing, in the NAND memory 20, all the pieces of translation information 1311 which belong to the target region. A bundle of pieces of translation information 1311 collectively non-volatilized in the NAND memory 20 will be denoted as region translation information. The location information group 132 has a table structure having a region address as an index and a physical address indicating a location of region translation information as a data item.

A region address as an index of region translation information which is a target of non-volatilization and a physical address indicating a write destination location of the region translation information are associated with each other and written in each of the logs 204, 204a. The second recording units 115, 115a store the logs 204, 204a in the log areas 203, 203a in response to the non-volatilization of the region translation information.

As described above, the translation information group 131 can be configured to be non-volatilized by the unit larger than the translation information 1311. According to this configuration, the size of the location information group 132 can be more greatly reduced as compared with the case where the translation information 1311 is individually non-volatilized.

(Ninth Embodiment)

The log areas 203, 203a may be allocated in a predetermined portion of a block. In a ninth embodiment, a technique for allocating the log areas 203, 203a in a predetermined portion of a block will be explained. The ninth embodiment can be applied to the memory systems 1, 1a according to the first to eighth embodiments.

In the NAND memory 20, one or more block storing region translation information are allocated. Each block storing region translation information will be denoted as translation information block. The log areas 203, 203a are allocated in the predetermined portion of each translation information block.

Figure 23:
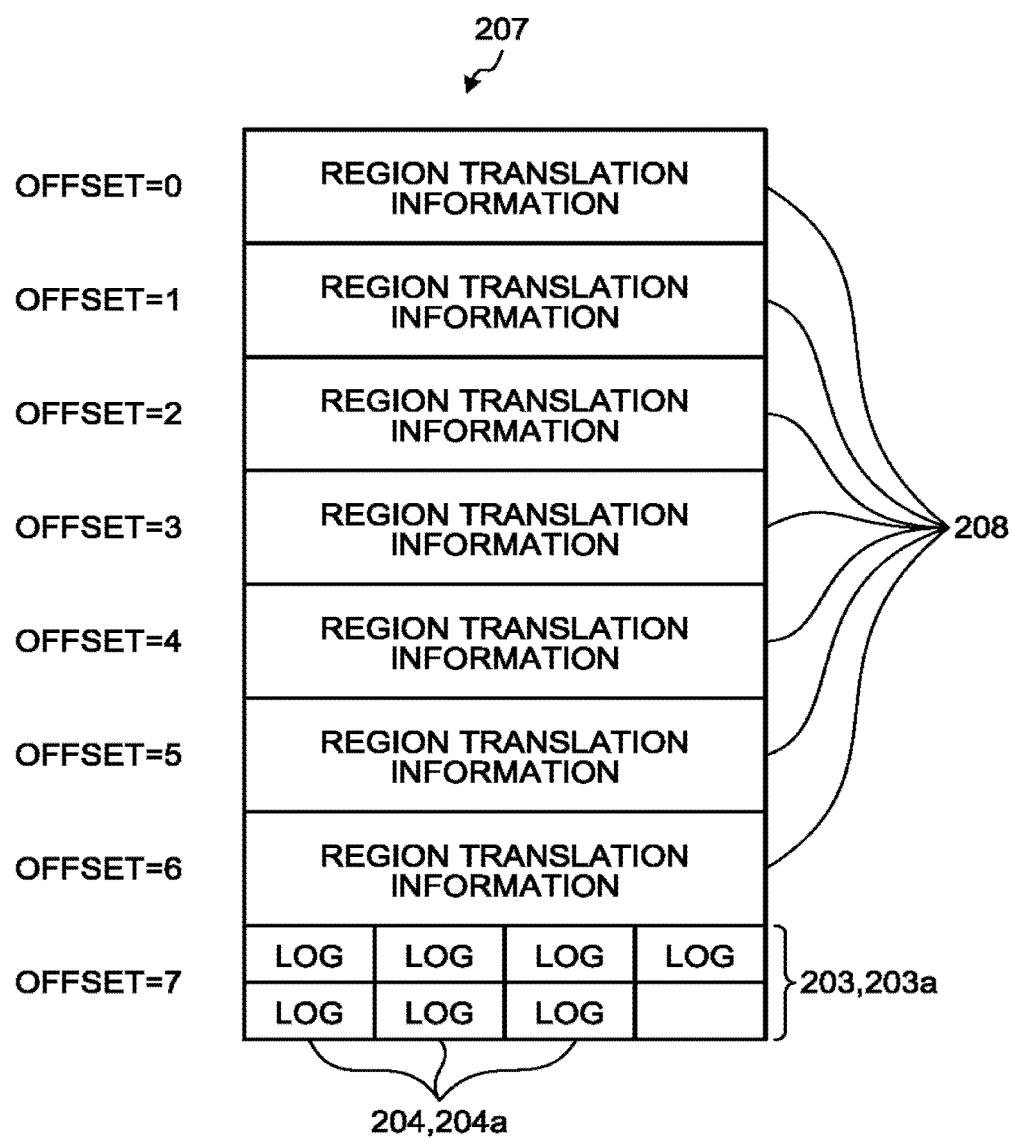
FIG. 23 is a figure illustrating a log area according to a ninth embodiment.

FIG. 23 is a figure illustrating a log area according to the ninth embodiment. According to the ninth embodiment, the log areas 203, 203a are allocated at the end of the translation information block 207. Noted that the log areas 203, 203a may be allocated at the end of a page or pages in the translation information block 207. In the example of this drawing, a single translation information block 207 has a size enough to store eight pieces of region translation information 208. A piece of translation information block 207 stores seven pieces of region translation information 208 in the sequence from the head of the translation information block 207. The area at the end of the translation information block 207 (i.e., an area obtained by offsetting the size of seven pieces of region translation information 208 from the head of the translation information block 207) is used as the log areas 203, 203a. Seven logs 204, 204a respectively corresponding to seven pieces of region translation information 208 stored in the same translation information block 207 are written in the log areas 203, 203a. The second recording units 115, 115a write seven pieces of region translation information 208 to a translation information block 207, and thereafter, write the corresponding seven logs 204, 204a to the log areas 203, 203a of the translation information block 207. The second recording units 115, 115a write the corresponding logs 204, 204a to the log areas 203, 203a in the same sequence as the sequence of the locations in which the region translation information 208 is stored.

Therefore, the region translation information 208 stored at the i-th location from the head of the single translation information block 207 corresponds to the logs 204, 204a stored at the i-th location from the head of the log areas 203, 203a of the single translation information block 207. The first recovery units 116, 116a can calculate the location of the corresponding region translation information 208 from the locations where the logs 204, 204a are stored. Therefore, for example, according to the ninth embodiment, only the region addresses are written in the logs 204, 204a.

The translation information block 207 is allocated individually for each partial space, so that the log areas 203, 203a can be allocated for each partial space.

As described above, the log areas 203, 203a can be set in a portion of the predetermined block. For example, the log areas 203, 203a can be set in a portion of the block where the translation information 1311 is stored.

(Tenth Embodiment)

In the explanation about the first to ninth embodiments, the entire translation information group 131 is stored in the RAM 13. The memory systems 1, 1a may be configured so that a portion of the translation information group 131 is stored in the RAM 13. An example where a portion of the translation information group 131 is stored in the RAM 13 will be explained in a tenth embodiment. The tenth embodiment can be applied to the memory systems 1, 1a according to the first to ninth embodiments.

Figure 24:
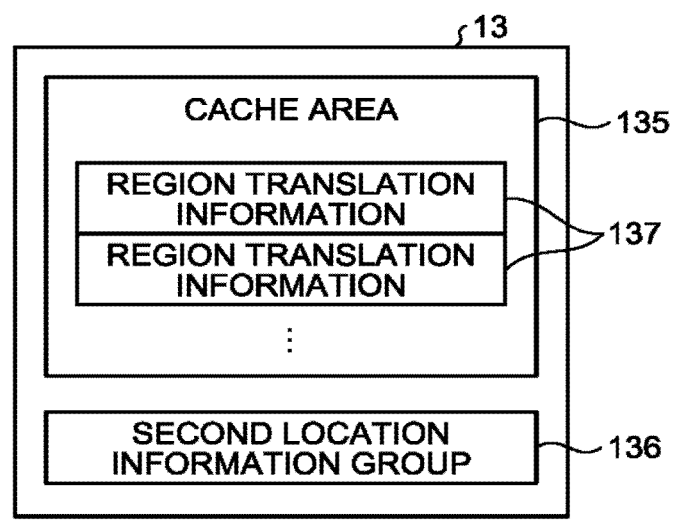
FIG. 24 is a figure illustrating an example of a configuration of a RAM according to a tenth embodiment.

For example, as shown in FIG. 24, a cache area 135 is allocated in the RAM 13, and the second location information group 136 is stored therein. Other information stored in the RAM 13 is not shown in the drawing.

The cache area 135 caches the translation information 1311. In this case, the translation information 1311 is assumed to be cached in the unit of the region (region translation information 137). Upon booting, the second recovery unit 117 recovers the region translation information 137 in, for example, the unit of the partial space. In which partial space the region translation information 137 is recovered may be determined by any given method.

Figure 25:
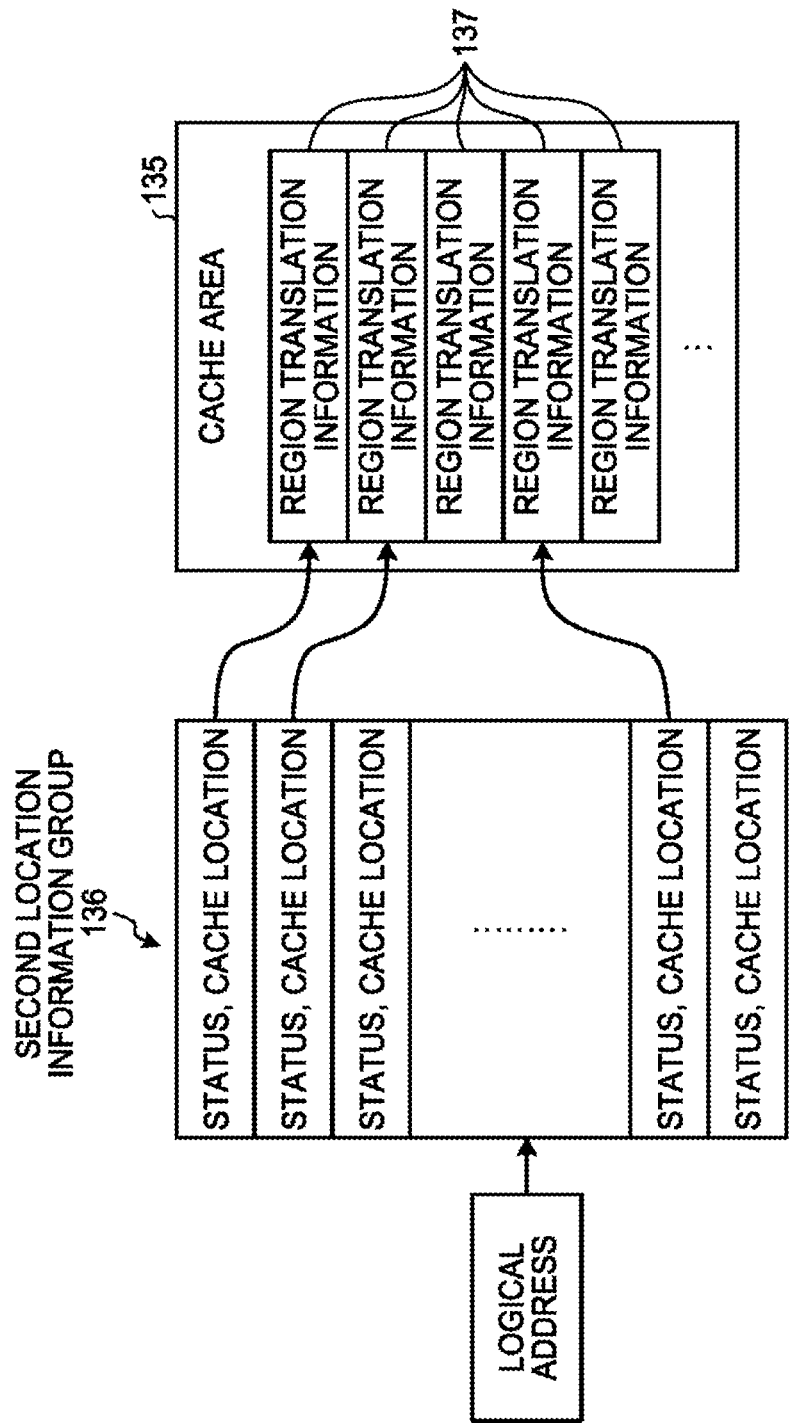
FIG. 25 is a figure illustrating an example of a data structure of a second location information group.

FIG. 25 is a figure illustrating an example of a data structure of the second location information group 136. The second location information group 136 has a table structure having a logical address as an index and a status and a cache location as a data item. The status indicates at least whether the corresponding region translation information 137 is cached in the cache area 135 or not. In a case where at least the corresponding region translation information 137 is cached in the cache area 135, the cache location indicates the location where the corresponding region translation information 137 is cached in the cache area 135.

The processing unit 113 updates the second location information 136 when the region translation information 137 is stored in the cache area 135. More specifically, the processing unit 113 updates the location where the region translation information 137 is stored and the status in the second location information 136. The processing unit 113 refers to the second location information group 136 when the logical address is translated into the physical address, so that the processing unit 113 determines whether the region translation information 137 corresponding to the target logical address is cached in the cache area 135. In a case where the corresponding region translation information 137 is cached in the cache area 135, the processing unit 113 uses the corresponding region translation information 137 cached in the cache area 135 to translate the target logical address into the physical address. In a case where the corresponding region translation information 137 is not cached in the cache area 135, the processing unit 113 identifies the location of the corresponding region translation information 137 in the NAND memory 20 by referring to the location information group 132, and transfers the corresponding region translation information 137 from the NAND memory 20 to the cache area 135.

The processing unit 113 also executes eviction of the region translation information 137 from the cache area 135. Upon eviction of the region translation information 137, the first recording unit 114 executes non-volatilization of dirty region translation information 137. When the first recording unit 114 executes non-volatilization of dirty region translation information 137, the second recording units 115, 115a write the logs 204, 204a to the log areas 203, 203a. The processing unit 113 updates the second location information 136 in response to the eviction of the region translation information 137 from the cache area 135. More specifically, the processing unit 113 at least updates a status indicating that the corresponding region translation information 137 is cached in the cache area 135 to a status indicating that the corresponding region translation information 137 is not cached in the cache area 135.

As described above, instead of loading all the translation information 1311 to the RAM 13, the memory systems 1, 1a can be configured so that only some of pieces of the translation information 1311 are cached to the RAM 13.

(Eleventh Embodiment)

In the explanation about the first to ninth embodiments, the pieces of the translation information 1311 are arranged in the sequence of the logical address corresponding to the written physical address. However, the sequence of the arrangement of each piece of the translation information 1311 is not limited thereto. For example, a buffer area may be allocated in the RAM 13, and the translation information 1311 may be input into and output from the buffer area in accordance with a predetermined rule (FIFO and the like).

In the explanation about the first to ninth embodiments, the user data 201, the translation information 202, and the logs 204, 204a are all stored in the NAND memory 20. The memory systems 1, 1a may have multiple nonvolatile memories including the NAND memory 20, and the user data 201 and the translation information 202 may be stored in different nonvolatile memories. The user data 201 and the logs 204, 204a may be stored in different nonvolatile memories each other.

In explanation about the first to fifth embodiments, the translation information group 131 and the location information group 132 are all stored in the RAM 13, and in the explanation about the sixth to ninth embodiments, the translation information group 131, the location information group 132, the current SS ID 133, and each piece of SS location information 134 are all stored in the RAM 13. In a case where the RAM 13 is constituted by multiple types of RAMs (DRAM, SRAM, and the like), each piece of information may be stored in a RAM of a type different from each other. For example, the translation information group 131 and the location information group 132 are stored in the DRAM, and the SS ID current value 133 and the SS location information 134 are stored in the SRAM.

(Twelfth Embodiment)

Figure 26:
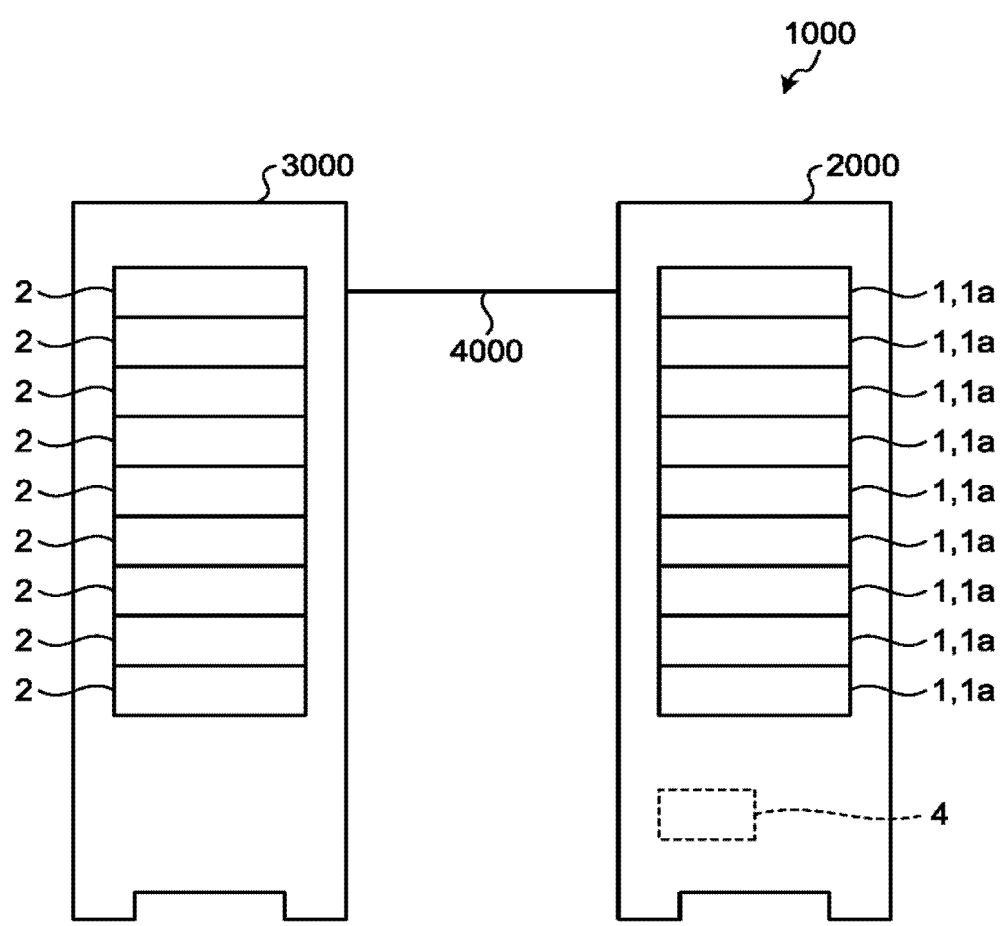
FIG. 26 is a figure illustrating an example of an implementation of a memory system.

FIG. 26 is a figure illustrating an example of an implementation of memory systems 1, 1a. The memory systems 1, 1a are implemented on, for example, a server system 1000. The server system 1000 is configured by connecting a disk array 2000 and a rack mount server 3000 via a communication interface 4000. Any given standard may be employed as the standard of the communication interface 4000. The rack mount server 3000 includes a server rack, and is configured such that one or more hosts 2 are mounted on the server rack. Each host 2 can access the disk array 2000 via the communication interface 4000.

The disk array 2000 includes a server rack, and is configured such that one or more memory systems 1, 1a are mounted on the server rack. In the disk array 2000, not only the memory systems 1, 1a but also one or more hard disk units may be mounted. Each of the memory systems 1, 1a can execute a command from each host 2. In addition, the disk array 2000 may include a power source 4 therein. Each of the memory systems 1, 1a operates by using the electric power provided from the power source 4. Each of the memory systems 1, 1a has a configuration employing the first to tenth embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile first memory storing translation information, the translation information associating a logical address and a physical address, the logical address indicating a location in an address space provided to the host, the physical address indicating a physical location in the first memory;
a volatile second memory storing location information, the location information associating a logical address and a location where the translation information is stored in the first memory; and
a controller circuit saving a first memory image into the first memory at a first timing, and saving a second memory image into the first memory at a second timing different from the first timing,
the first memory image being a part of a memory image of the location information and corresponding to a first portion of the address space, and
the second memory image being another part, different from the part of the first memory image, of the memory image of the location information and corresponding to a second portion, different from the first portion, of the address space,
wherein
the address space includes a first address space and a second address space,
the first address space includes the first portion,
the second address space includes the second portion, and
the controller circuit writes the translation information into the first memory between the first timing and the second timing, and updates the location information in a case where the translation information is written into the first memory, and
wherein
the controller circuit repeats, for plural times, processes of saving the first memory image into the first memory at a third timing and saving the second memory image into the first memory at a fourth timing which is a timing after the third timing,
the first timing is a last timing of one or more of the third timings, and
the second timing is a timing of one or more of the fourth timings.

2. The memory system according to claim 1, wherein the controller circuit writes a log into the first memory when the translation information is written into the first memory, the log being a change in the location information.

3. The memory system according to claim 2, wherein
the first memory image is a memory image of first location information,
the second memory image is a memory image of second location information,
the first location information is a portion of the location information associating a logical address belonging to the first address space and a physical location of a portion of the translation information, and
the second location information is a portion of the location information associating a logical address belonging to the second address space and a physical location of another portion of the translation information.

4. The memory system according to claim 3, wherein, upon booting, the controller circuit
loads the first memory image and the second memory image to the second memory,
in a case where the log is a change in the first location information and a change after the first timing, reflects the log to the first memory image loaded to the second memory,
in a case where the log is a change in the second location information and a change after the second timing, reflects the log to the second memory image loaded to the second memory.

5. The memory system according to claim 4, wherein the controller circuit associates the first memory image, the second memory image, and the log respectively with numerical value information according to timing for saving the first memory image, the second memory image, and the log, and determines whether or not the log is a change after the first timing, and whether or not the log is a change after the second timing, based on the numerical value information, respectively.

6. The memory system according to claim 3, wherein the controller circuit stores, to the second memory, a physical location in the first memory of the first memory image saved at the first timing, and a physical location in the first memory of the second memory image saved at the second timing, and saves, to the first memory, the physical locations stored in the second memory upon power supply interruption.

7. The memory system according to claim 4, wherein the first memory includes a first log area and a second log area,
wherein the controller circuit writes the log into the first log area if the log is a change in the first location information, and writes the log into the second log area if the log is a change in the second location information.

8. The memory system according to claim 3, wherein the controller circuit starts, at a fifth timing, a first recovery that is recovery of the first location information to the second memory by using the first memory image and starts at a sixth timing, a second recovery that is recovery of the second location information to the second memory by using the second memory image, the fifth timing being different from the sixth timing, and,
the controller circuit is configured to be able to execute processing different from any of the first recovery and the second recovery between the first recovery and the second recovery.

9. The memory system according to claim 1, wherein the controller circuit is able to, between the first timing and the second timing, update the location information when the translation information is written in the first memory.

10. The memory system according to claim 9, wherein the controller circuit is able to, between the first timing and the second timing, write a log into the first memory when the translation information is written into the first memory, the log being a change in the location information.

11. A memory system connectable to a host, comprising:
a nonvolatile first memory storing translation information, the translation information associating a logical address and a physical address, the logical address indicating a location in an address space provided to the host, the physical address indicating a physical location in the first memory;
a volatile second memory storing location information, the location information associating a logical address and a physical location where the translation information is stored; and
a controller circuit configured to write a log into the first memory when the translation information is written into the first memory, the log being a change in the location information, wherein,
upon booting, the controller circuit loads a first memory image and a second memory image to the second memory, the first memory image being a memory image of first location information and being saved into the first memory at a first timing, the second memory image being a memory image of second location information and being saved into the first memory at a second timing different from the first timing, the first location information being a portion of the location information and associating a logical address belonging to a first address space with a physical location of a portion of the translation information, the second location information being a portion of the location information and associating a logical address belonging to a second address space with a physical location of another portion of the translation information, the first address space and the second address space being different portions of the address space from each other,
in a case where the log is a change in the first location information and a change after the first timing, reflects the log to the first memory image loaded to the second memory, and
in a case where the log is a change in the second location information and a change after the second timing, reflects the log to the second memory image loaded to the second memory,
wherein the controller circuit writes the translation information into the first memory between the first timing and the second timing, and updates the location information in a case where the translation information is written into the first memory,
wherein
the controller circuit repeats, for plural times, processes of saving the first memory image in the first memory at a third timing and saving the second memory image in the first memory at a fourth timing, which is a timing after the third timing,
the first timing is a last timing of one or more of the third timings, and
the second timing is a last timing of one or more of the fourth timings.

12. The memory system according to claim 11, wherein the first memory includes a first log area and a second log area,
wherein in a case where the log is a change in the first location information, the controller circuit writes the log into the first log area, and in a case where the log is a change in the second location information, the controller circuit writes the log into the second log area.

13. The memory system according to claim 11, wherein the controller circuit is able to, between the first timing and the second timing, update the location information when the translation information is written into the first memory.

14. The memory system according to claim 13, wherein the controller circuit is able to, between the first timing and the second timing, write the log into to the first memory when the translation information is written into the first memory.

15. A method for controlling a memory system comprising a nonvolatile first memory and a volatile second memory, the method comprising:
storing, into the first memory translation information, the translation information associating a logical address and a physical address, the logical address indicating a location in an address space provided to a host, the physical address indicating a physical location in the first memory;

storing, into the second memory, location information, the location information associating a logical address and a location where the translation information is stored in the first memory;

saving a first memory image into the first memory at a first timing, the first memory image being a part of a memory image of the location information and corresponding to a first portion of the address space;

saving a second memory image into the first memory at a second timing different from the first timing, the second memory image being another part, different from the part of the first memory image, of the memory image of the location information and corresponding to a second portion, different from the first portion, of the address space, wherein the address space includes a first address space and a second address space, the first address space includes the first portion, and the second address space includes the second portion;

writing the translation information into the first memory between the first timing and the second timing;

updating the location information in a case where the translation information is written into the first memory; and repeating, for plural times, processes of saving the first memory image into the first memory at a third timing and saving the second memory image into the first memory at a fourth timing, which is a timing after the third timing, the first timing being a last timing of one or more of the third timings, the second timing being a last timing of one or more of the fourth timings.

16. The method according to claim 15, further comprising writing a log into the first memory when the translation information is written into the first memory, the log being a change in the location information.

17. The method according to claim 15, further comprising:

starting, at a fifth timing, a first recovery that is recovery of first location information to the second memory by using the first memory image;

starting, at a sixth timing, a second recovery that is recovery of second location information to the second memory by using the second memory image, the fifth timing being different from the sixth timing; and executing processing different from any of the first recovery and the second recovery between the first recovery and the second recovery, wherein the first location information is a portion of the location information associating a logical address belonging to the first address space and a physical location of a portion of the translation information, and the second location information is a portion of the location information associating a logical address belonging to the second address space and a physical location of another portion of the translation information.

18. The method according to claim 15, further comprising:

updating, between the first timing and the second timing, the location information when the translation information is written in the first memory.

* * * * *